United States Patent [19]

Cooper et al.

[11] Patent Number: 5,550,594
[45] Date of Patent: Aug. 27, 1996

[54] APPARATUS AND METHOD FOR SYNCHRONIZING ASYNCHRONOUS SIGNALS

[75] Inventors: J. Carl Cooper, Monte Sereno; David Wallen, San Francisco; Mirko Vojnovic, Santa Clara; Howard Loveless, Ben Lomond, all of Calif.

[73] Assignee: Pixel Instruments Corp., Los Gatos, Calif.

[21] Appl. No.: 96,240

[22] Filed: Jul. 26, 1993

[51] Int. Cl.$^6$ .................................................... H04N 9/475
[52] U.S. Cl. ............................................ 348/513; 348/512
[58] Field of Search .................................... 348/536, 537, 348/538, 539, 540, 541, 542, 510, 512–520, 714, 715, 716, 717, 718, 719, 720, 721; H04N 5/04, 5/06, 7/00, 5/14, 9/475

[56] References Cited

U.S. PATENT DOCUMENTS 3,909,839  9/1975  Inaba et al. ............................. 348/537
4,109,276  8/1978  Hopkins, Jr. et al. ................... 348/715
4,110,785  8/1978  Dischert et al. ......................... 348/715
4,527,145  7/1985  Haussmann et al. .................... 348/537
4,623,922  11/1986  Wischermann ......................... 348/704
4,812,783  3/1989  Honjo et al. ............................. 348/537
4,992,874  2/1991  Willis et al. ............................. 340/565

OTHER PUBLICATIONS

Data Sheet for TRW TMC 2242 from TRW LSI Products 1991 Data Book.

Primary Examiner—James J. Groody
Assistant Examiner—Michael H. Lee
Attorney, Agent, or Firm—J. Carl Cooper

[57] ABSTRACT

This invention is a method and apparatus for synchronization of high quality video like signals. Full sync tip to peak white video is digitized in the preferred embodiment along with oversampling and interpolation so that errors are kept to unexpected low levels. The preferred embodiment is described to pass one or more secondary signal with the video signal in a separate parallel but time related path. The use of the input signal for a reference to allow a fixed delay is also shown.

37 Claims, 37 Drawing Sheets

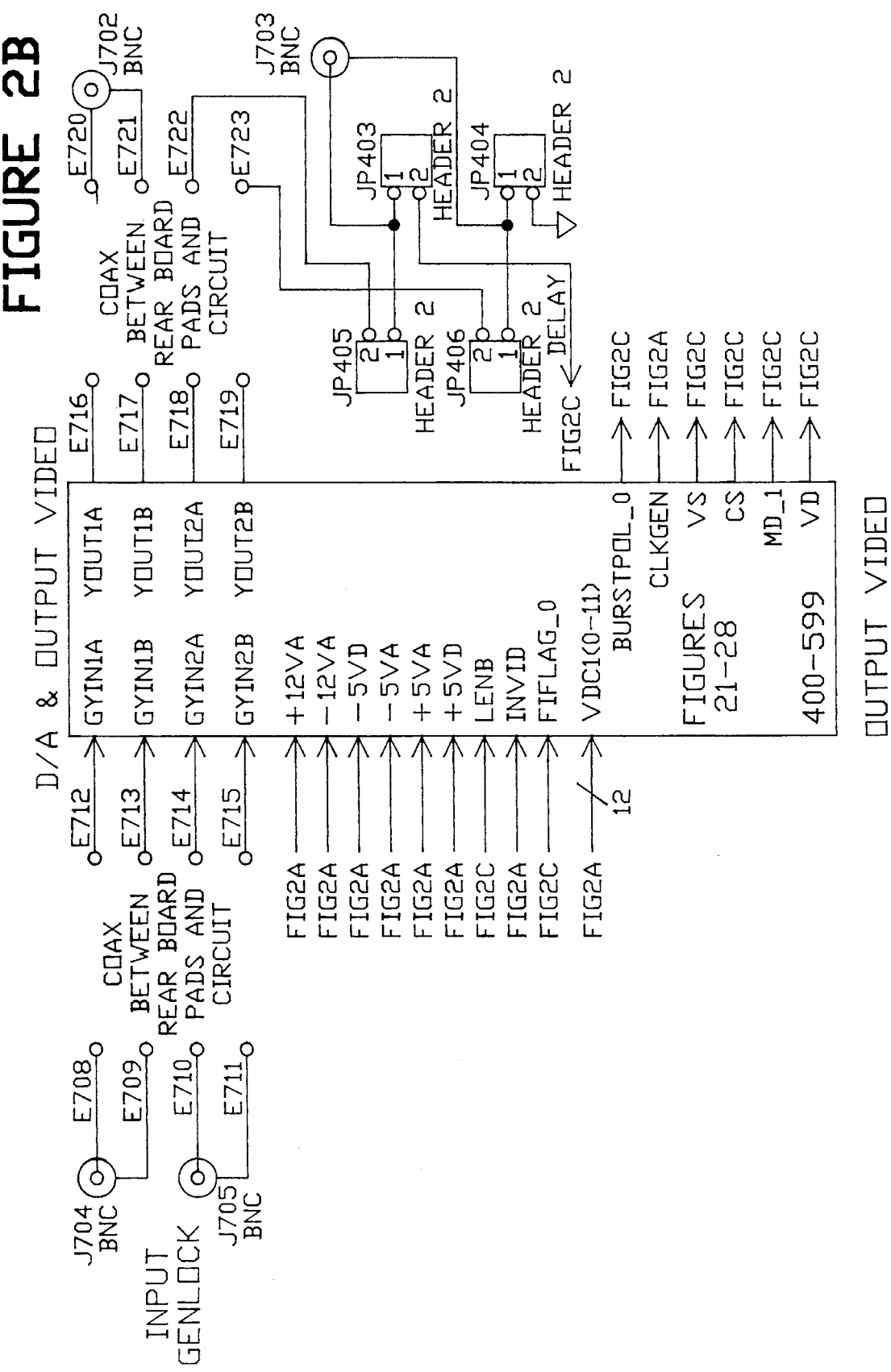

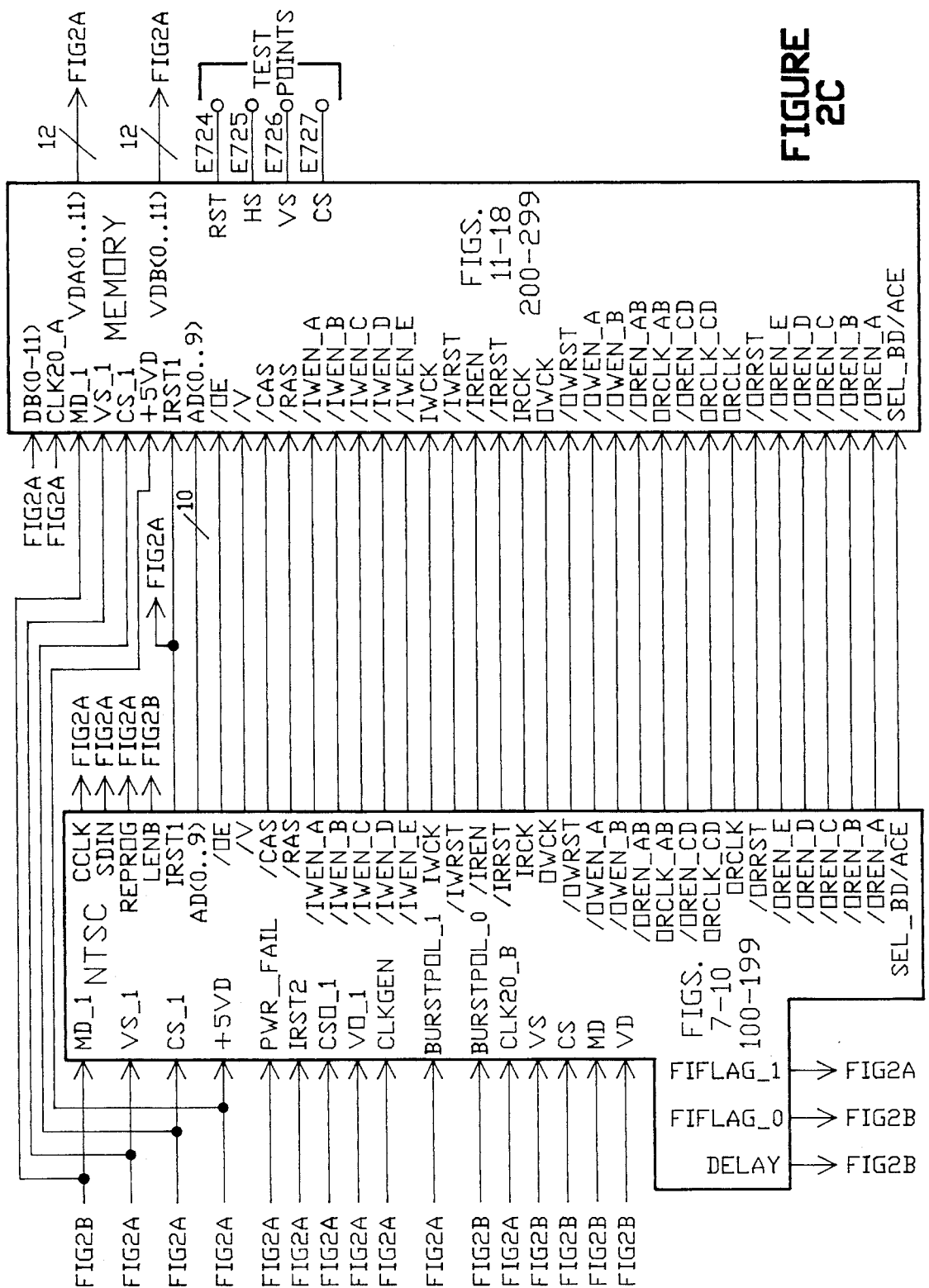

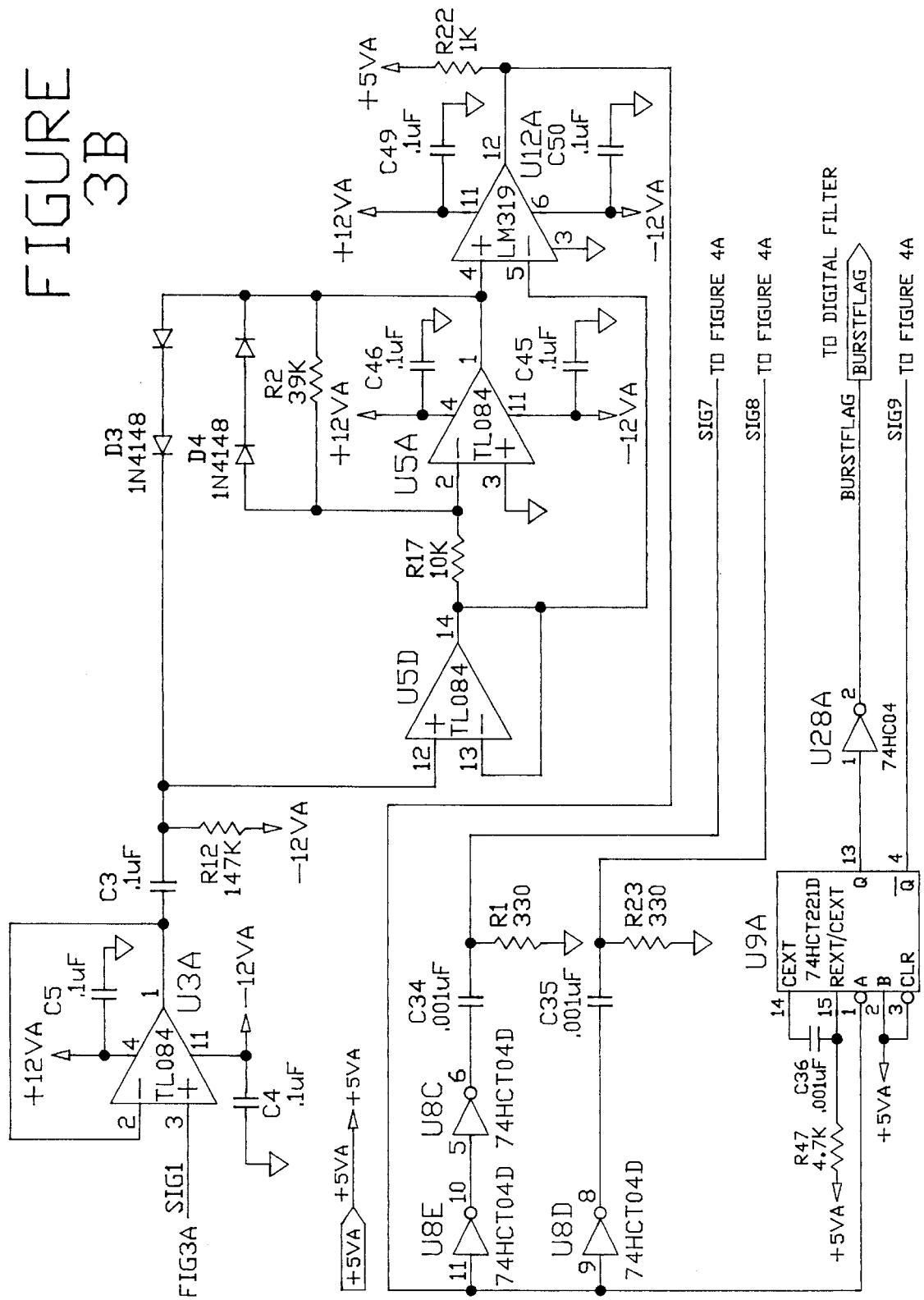

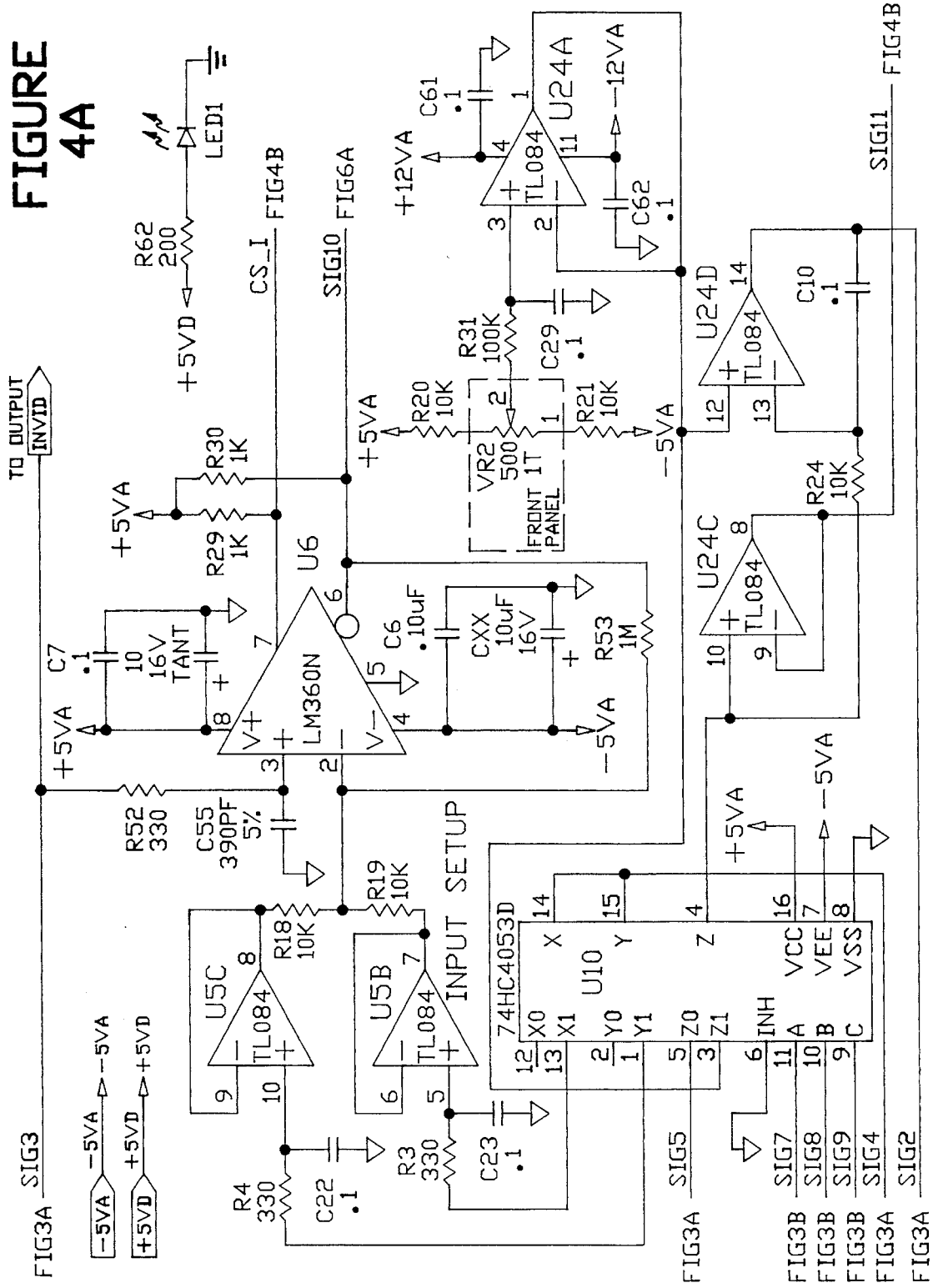

APPARATUS AND METHOD FOR SYNCHRONIZING ASYNCHRONOUS SIGNALS

BACKGROUND OF THE INVENTION

1. Field of the Invention

The present invention relates to the field of synchronizing asynchronous signals and finds particular use in synchronizing video type signals in television systems.

2. Description of the Prior Art

The prior art contains many circuits for video synchronizers, beginning with U.S. Pat. No. 4,018,990. These synchronizers generally provide video synchronization by sampling and digitizing the active video portion of a video signal in response to the timing thereof, storing the digitized video in a memory, reading the digitized video from the memory at a proper time in response to a reference signal to achieve synchronization thereof, converting the read digitized video back to analog, and reconstructing and combining sync, burst and blanking with the read analog video.

Various techniques and circuits to perform these functions are well known in the art, and emphasis has been placed on improving performance in terms of minimizing noise and distortion from the digitizing process, and improving the immunity of the devices to noise which may be carried with or interfere with the signal which is being synchronized.

SUMMARY OF THE INVENTION

The inventive video synchronizer and improvements described herein are designed to allow synchronization of high quality video like signals while providing minimum distortion and maximum transparency. Because full sync tip to peak white video is digitized in the preferred embodiment shown herein, one would normally expect quantizing errors to be significant. The inventive features of the preferred embodiment however show the use of sophisticated digital signal processing techniques such as oversampling and interpolation, such that these errors are kept to unexpected low levels.

The inventive concepts described herein are applicable for many video signal standards, including but not limited to MONOCHROME, SECAM, PAL, NTSC and HDTV versions. The preferred embodiment is suitable to be constructed on a single small, low power PC board which because of small size and low power may be installed in various case configurations. It is also shown to pass one or more secondary signal with the video signal in a separate parallel but time related path.

The inventive concepts described herein are well suited for use in synchronizing satellite feeds, inter-suite connections and in house signals, thus eliminating the use of expensive and cumbersome multiple genlocking and timing schemes.

OBJECTS OF THE INVENTION INCLUDE:

An improved video synchronizer designed to allow synchronization of high quality video like signals while providing minimum distortion and maximum transparency.

A synchronizer which maintaining high signal quality at a reasonable price.

A synchronizer which digitizes full sync tip to peak white video with low quantizing error and distortion.

A digital signal device which makes use of oversampling and interpolation, such that sampling and quantizing errors are kept to unexpected low levels.

A video synchronizer which may be constructed on a single PC board and which may be installed in various case configurations.

A multiple signal synchronizer configuration in which a single genlock circuit may be utilized to provide reference signals for multiple synchronizers, but still retain individual genlock phase controls for each.

A signal synchronizer to use the input signal as the reference to allow the synchronizer to be used as an adjustable, fixed length delay, which use may be automatically switched.

A signal synchronizer capable of using recursive and nonrecursive adaptive filtering for noise reduction, image enhancement or other features.

A signal synchronizer capable of storing a full repetition period of the signal in memory.

A video signal synchronizer capable of digitizing and storing the entire video signal, including all sync, burst, horizontal blanking and vertical blanking so as to pass all signals encoded outside the active video area.

A video synchronizer capable of selecting ones of the signals contained within the blanking areas, so that those signals may be preserved and passed with only the repetitive sync burst and blanking reconstructed and reinserted in the stored signals from the memory.

A video signal processing device having a memory for storing the video signal and having a parallel storage path useful in video or television systems for the passing of one or more related or unrelated secondary signals with the video signal in order to maintain separate parallel but time related transmission paths for the secondary signals.

A synchronizer for video type signals in which reduction in size and power consumption is brought about by minimizing the electronic circuitry.

These and other objects of the invention will become apparent to one skilled in the art from the description herein, taken in conjunction with the attached drawings.

FIG. 1 shows a block diagram of the preferred embodiment of the invention, which diagram is applicable for the various video signal standards which the invention may be used with, including NTSC and PAL.

DESCRIPTION OF THE PREFERRED EMBODIMENT

Figure 1:
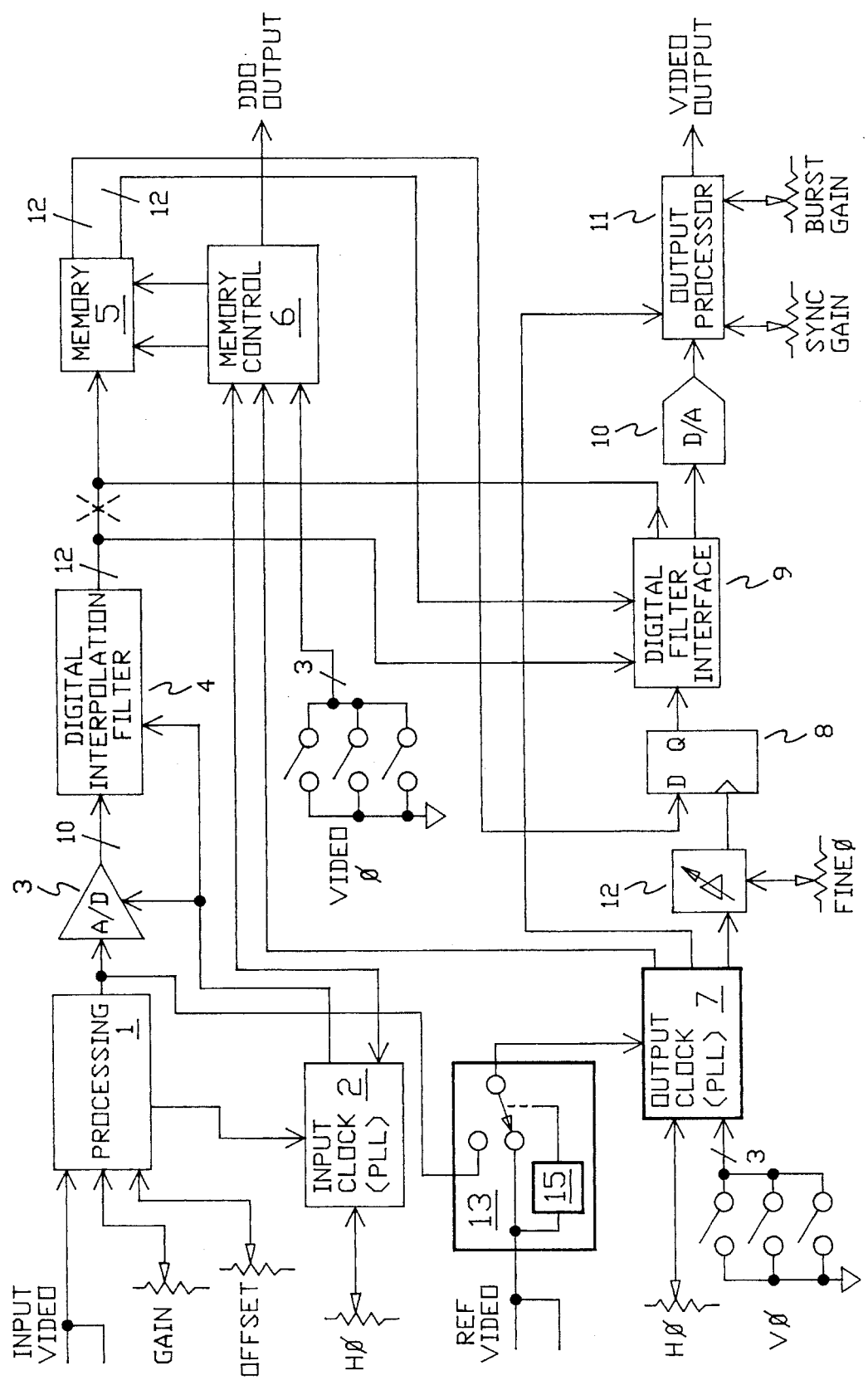
FIG. 1 is a block diagram of the preferred embodiment of the invention.

The preferred embodiment described herein is preferred for use with reference signals of a type similar to the common black burst signal. Alternatively, other signals may be utilized for reference, for example individual ones of clock, subcarrier, H and V sync and field one reference may be utilized in respect to the multiple synchronizer configuration described herein. In such multiple synchronizer configuration a single genlock circuit may be utilized to provide such reference signals for all of the multiple synchronizers being utilized, but still retaining individual phase controls for each. Such is very useful since it is a common requirement to synchronize several signals to a common reference, Unlike other synchronizers which switch to an independent internally generated reference in the event that an external reference signal is not supplied, the preferred embodiment of the present invention teaches to automatically switch to use the input video like signal as the reference. This novel feature allows the synchronizer to be used as an adjustable, fixed length delay, useful for a variety of timing and other purposes.

Novel digital signal processing techniques are also shown, such as video oversampling, recursive and nonrecursive adaptive noise reduction filtering. In the preferred embodiment, 10 bit oversampling with 12 bit processing and D-A conversion are used to maintain the utmost video signal integrity. A full 8 field video memory is shown for both PAL and NTSC, thus eliminating the need for chroma inverters and their inherent degradation of the signal.

The preferred embodiment of the invention makes use of video oversampling which is performed at $2560 \times f_h$ (40.3 MHz in NTSC) in the A-D conversion to provide digitized samples of the video, followed by digital interpolation filtering of the digitized samples to provide filtered samples in order to completely eliminate the high frequency phase distortion normally found in analog anti alias filters. This frequency is much higher than the highest standard frequency in use which is four times subcarrier (14.3 MHz for NTSC). In addition, this technique considerably reduces the quantizing and other distortions which normally plague digital devices. While the use of oversampling to ease input anti alias filtering is known in the industry. It should be noted that it is believed that the use of oversampling and interpolation to an increased number of bits of resolution is believed to be a novel feature in view of the unexpected result of reducing distortions occurring in the sampling and A-D conversion process. Most pronounced of these reduced distortions is a better than theoretical quantizing noise performance. Such decrease in quantizing noise allows system performance to be greater than that of the A/D and D/A convertors (which seldom are perfect), and in fact greater that what is normally considered theoretically possible for the given resolution of the A-D convertor. In addition other benefits are had, such as reduced differential gain and phase as well as reduced harmonic and phase distortion are all achieved by oversampling and interpolation, all of which are often reduced to levels lower than those achieved by a given A-D convertor operating without such oversampling and interpolation.

In addition to the excellent video performance, the inventive concepts described herein with respect to the preferred embodiment show to sample, digitize and store the entire video signal, including all syncs, burst, horizontal blanking and vertical blanking. Such storage of the entire video signal is contrary to the established practice in the art, where only the active video portion of the signal is digitized and stored, and the repetitive sync, burst and blanking portions of the signal (which are mathematically defined and repetitive in nature) are reconstructed and added to the active video read from the memory. By digitizing and storing the full signal, all VITS (Vertical Interval Test Signals), VIRS (Vertical Interval Reference Signal), VITC (Vertical Interval Time Code), sound in sync and any other of the useful but nonrepetitive signals encoded outside the active video area may be preserved and passed. For the purpose of further explanation of the invention, these information containing signals which reside outside of active video area of the signal will be referred to as the nonrepetitive signals (although some are in fact repetitive), and the repetitive signals such as horizontal and vertical sync and blanking, and color burst will be referred to generally as syncs or synchronizing signals. It will be known to one skilled in the art from the teachings herein that select portions contained within the blanking areas of the stored video from the memory may be preserved and passed and known ones of the repetitive sync burst and blanking portions may be reconstructed and inserted in the synchronized video.

Although the continuous digitizing and storing of video type signals presents a number of particular technical challenges, the most critical being that there is no time to clear, reset or synchronize FIFO memories and DRAM memory address circuits, such problems are overcome by the present invention, which solutions will be apparent to one skilled in the art from the teachings herein.

The ability to pass VITC will be quite useful for inter suite use and the preservation of sound in sync will be especially useful for PAL applications where such signals are commonly used. Alternatively, if the user does not desire to maintain this information, or wishes to insert new information, full reinsertion of sync, blanking and burst may be selected. Alternatively, as will be apparent from the teachings herein, it will be shown to digitize only the active video, and selected ones of the nonrepetitive signals contained within the blanking areas, so that those signals may be preserved and passed and selected ones of the repetitive sync burst and blanking may be reconstructed and reinserted in the stored signals from the memory. Furthermore, in the preferred embodiment a full repetition period of memory is used, for example 8 fields for PAL, thus there is no chance of upsetting the proper chroma subcarrier sequence in either PAL or NTSC and the need for chroma inverters or other chroma phase correction schemes is eliminated.

With the widespread use of digital video processing, audio synchronization is becoming a significant problem.

The preferred embodiment shows inventive concepts which incorporate a digital delay output (DDO) which provides a steering signal to drive a companion audio synchronizer such as those described in U.S. Pat. Nos. 4,313,135 and 5,202,761, thus guaranteeing accurate audio to video synchronization.

The preferred embodiment described herein is shown schematically in FIGS. 2–28 and may be constructed with commonly available parts whose generic or manufacturers part numbers are given. While the part numbers for the ICs are commonly known, in the event that one does not immediately recognize the manufacturer, the IC Master may be consulted to locate the manufacturer from the part number prefix which is given. The preferred embodiment constructed according to the teaching herein meets the following technical description and is capable of meeting the following specifications with components which are commonly available. These specifications are common to both PAL and NTSC versions and where applicable will apply for other systems as well.

The preferred embodiment may be constructed on a single PC board suitable for mounting in a variety of case configurations, including a single board desk top version, a 6 board rack mount version, and a 12 board rack mount version. The 6 and 12 board versions may mix boards operating on various signal standards, for example NTSC and PAL boards. Schematic diagrams are shown in FIGS. 2–28 which have been constructed and tested to meet the following specifications and performance levels:

| | |
|---|---|
| Sampling Rate | 2560 × $f_h$, 40.3 MHz NTSC, 40.0 MHz PAL |
| Input Quantizing | 10 Bits |
| Digital Filtering | 2→1 decimation with 10→12 bit interpolation nonrecursive adaptive interpolation filtering digital anti-alias filtering optional adaptive recursive noise reduction optional digital temporal integration |
| Memory | 12 Bit video, including full storage of H and V blanking interval. |
| Bandwidth | ± 1% to 8 MHz |
| Thru Gain | Unity ± 1% |
| S/N | 60 dB unweighted over 10 Mhz bandwidth |
| Chroma/Luma gain error | <1% |
| Chroma/Luma timing error | <5 ns |
| Chroma/Luma intermodulation | <0.5% |
| Differential Gain | <1% |
| Differential Phase | <1° |
| K Factor (2T pulse) | <0.5% |
| 2T Pulse to Bar Error ratio | <1% |
| Short Time Distortion | <1% |
| Line Time Distortion | <0.25% |
| Field Time Distortion | <0.25% |
| Input/Output Crosstalk | −60 dB to 8 Mhz |
| PROCESSING AMPLIFIER | |
| control | selectable pass incoming blanking interval or insert new sync, burst and blanking. Inserted sync edges and burst envelope are sine$^2$ shaped. Sync and burst amplitude are adjustable. |

-continued

GENLOCK

| | |
|---|---|
| H φ adjust | ± 3 μs (output H to reference H) |
| V φ adjust | 3 H advance to 1H delay (output V to reference V) |
| Burst φ adjust | 360° (Inserted burst to reference burst) |

VIDEO PROC

| | |
|---|---|
| Video setup | ± 10 IRE (operative with inserted sync) |
| Video gain | ± 20 IRE |
| H φ adjust | ± 3 μs (active video to inserted sync) |
| Hue φ adjust | ± 20° (active video to inserted burst) |

INPUTS

Video in (differential looping)
Reference (differential looping)

OUTPUTS

Video 1
Video 2 / DDO (strap selectable)

FRONT PANEL CONTROLS and ADJUSTMENTS

Output Gain
Output Hue
Input Setup
Input Gain
Input 75Ω term
Hue
Digital Filter Select
Genlock Burst φ
Genlock Vφ
Genlock Hφ

POWER

110/120 or 220/240 volt strap selectable
50/60 Hz
32 Watts Max. 27 Watts typical

ENVIRONMENTAL

Temperature

Operating: 0° C. to +45° C.
Storage: −55° C. to +75° C.
Humidity: 10–95%, non condensing

TYPICAL MOUNTING CASE SIZES FOR PREFERRED EMBODIMENT

| | |
|---|---|
| Single board case | 1.75"H × 8.75"W × 17"D |
| Six Board case 19" rack mount | 3.5"H × 19"W × 18.5"D |
| Twelve Board case 19" rack mount | 7"H × 19"W × 18.5"D |

The diagram of FIG. 1 shows a video input terminal which is preferred to be of the high impedance looping type, which input is coupled to a processing section 1. The processing section operates to DC restore the video, remove common noise offset and noise, provide video gain and video offset to the video signal, which signal is coupled to the input of an Analog to Digital convertor section 3, and to a reference selecting section 13. In addition, the processing section 1 operates to recover synchronizing information from the input video signal, and coupled this synchronizing information to the input clock 4 section 2, which in the preferred embodiment contains a phase locked loop. The preferred embodiment operates to detect when the input signal is disrupted, with the memory responsive thereto to cease storing of samples and repetitively output a repetition period of stored samples during at least the pendency of the disruption.

The video from the processing section 1 is coupled to an A/D convertor section 3 where it is sampled and digitized at a first data rate, for example 40 MHz, in response to the input clock circuit 2. The digitized video from the A/D section 3 is coupled to the Digital Interpolation Filter section 4, which in the preferred embodiment operates to reduce the data rate of the digitized video from the first rate of 40 MHz to a second rate of 20 MHz. In addition, interpolation filter 4 operates to increase the number of bits of resolution of the digitized video signal, for example from 10 to 12.

The samples from the interpolation filter 4 are coupled to a memory section 5 under control of a memory control 6. The memory control 6 operates to store the incoming samples of the video signal at known locations in the memory, and when said samples are required to be output in response to the reference video from 13 as determined via output clock section 7, the memory control causes those samples to be read from the memory. For example, the first pixel of the first line of the first field of video may be written to memory address 0000 with the second pixel written to address 0001, etc. Shortly before it is required to output these pixels in order to have them synchronously related to the reference signal, the pixels are read from these addresses. It is not necessary that the address that a given pixel is written into always be the same, as the starting address may very well be different, progressing in some orderly fashion, or even randomly chosen. Such changing of writing address merely requires that the memory control 6 keep track of where the pixels are written so that they may be retrieved as needed.

In FIG. 1, the memory 5 is shown to have an input and two outputs. As is known in the industry, it is fairly easy to arrange memory devices in such a fashion as to have any required number of inputs and outputs or ports. It is also known to have common ports which can serve as either an input or output, all under control of memory control section 6.

It will be seen that memory output via connection X is coupled through a latch 8 which is clocked by a clock from variable delay 12 to achieve variable timing as required. It will be understood that while 8 is shown as a single DQ latch, it is intended to represent a variable delay of any integer or noninteger number of clock cycles as required.

The preferred embodiment of FIG. 1 contains a digital filter interface 9 which has coupled to it the output of the digital interpolation filter 4 via connection Y, the input of the memory 5 via connection Z, the two outputs of the memory 5 via connections X and W. Such arrangement allows the digital filter interface 9 to be electrically located in the data path into the memory, or the data path out of the memory, or both. In addition, the digital filter interface 9 has an output coupled to the Digital to Analog section 10 to provide output video thereto, for conversion back to analog, which analog output is then coupled to an output processor 11.

Output processor 11 may serve to pass the output analog video with a minimum of processing, or may be configured to insert one or more of newly constructed sync, blanking, burst or other timing or test signals.

Output clock section 7, operates to provide clock and timing signals to control the reading of memory. In the preferred embodiment, a reference video signal is applied to 7 via 13 and the output clock section operates in conjunction with 6 to cause the video output from 11 to be synchronously related to the reference signal. It is possible from the adjustment to the Hφ, Vφ and fineφ controls on 7 and 12 to obtain video output from 11 which has a controlled phase offset with respect to the reference. For example, the video output may be advanced somewhat to make up for subsequent delays it will experience in transiting the cabling to another device such as a production switcher. Such control with respect to an external reference is well known in the art.

A novel feature of this invention is the reference selector 13 which contains a reference video present detector 15 and in the event reference video is not present, this detector will cause the switch in 13 to select the input video or a version thereof to be coupled to the output clock section 7. This is different from the normal operation of clock generators which will switch over to a free running crystal. By using the input video, it is possible to synchronize the video output to the video input, in other words the video is synchronized to itself. This operation effectively causes the apparatus to operate as a fixed delay, however in the case where the H$\phi$ and V$\phi$ adjustments are used the delay becomes adjustable. This is a very useful feature where video timing needs to be advanced. The video is effectively delayed for a repetition period (for example 8 fields in PAL) less the amount of the advance required. If in addition new sync and burst is added, the video can be adjusted by the Video $\phi$ so that it can be repositioned with respect to the sync and burst thus making up for timing faults from other equipment.

Figure 31:
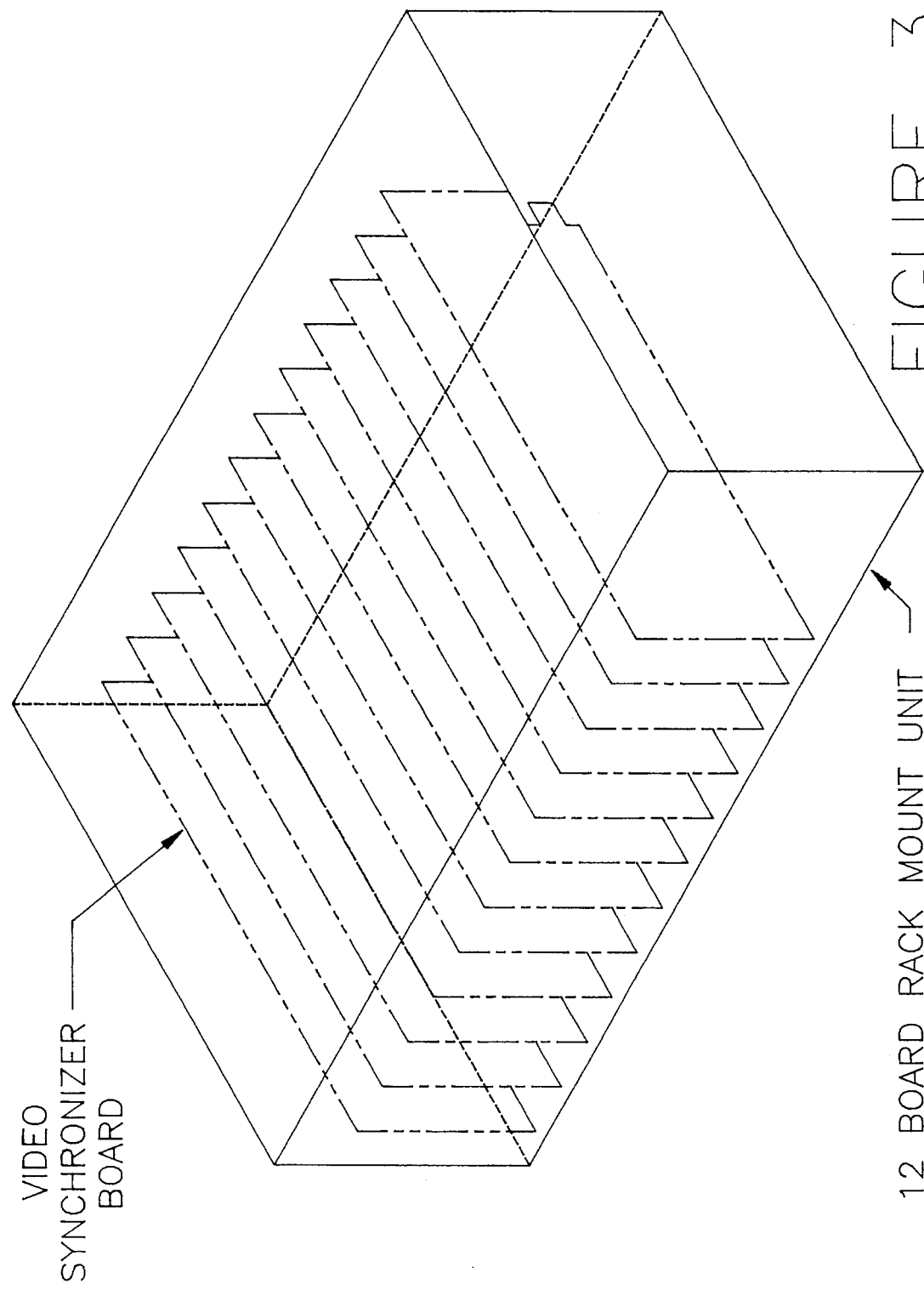
FIG. 31 is a third mechanical diagram of a third mechanical embodiment of the invention showing twelve electronic printed circuit boards each of which embodies the electronics of the preferred embodiment housed in a twelve board case.
Figure 32:
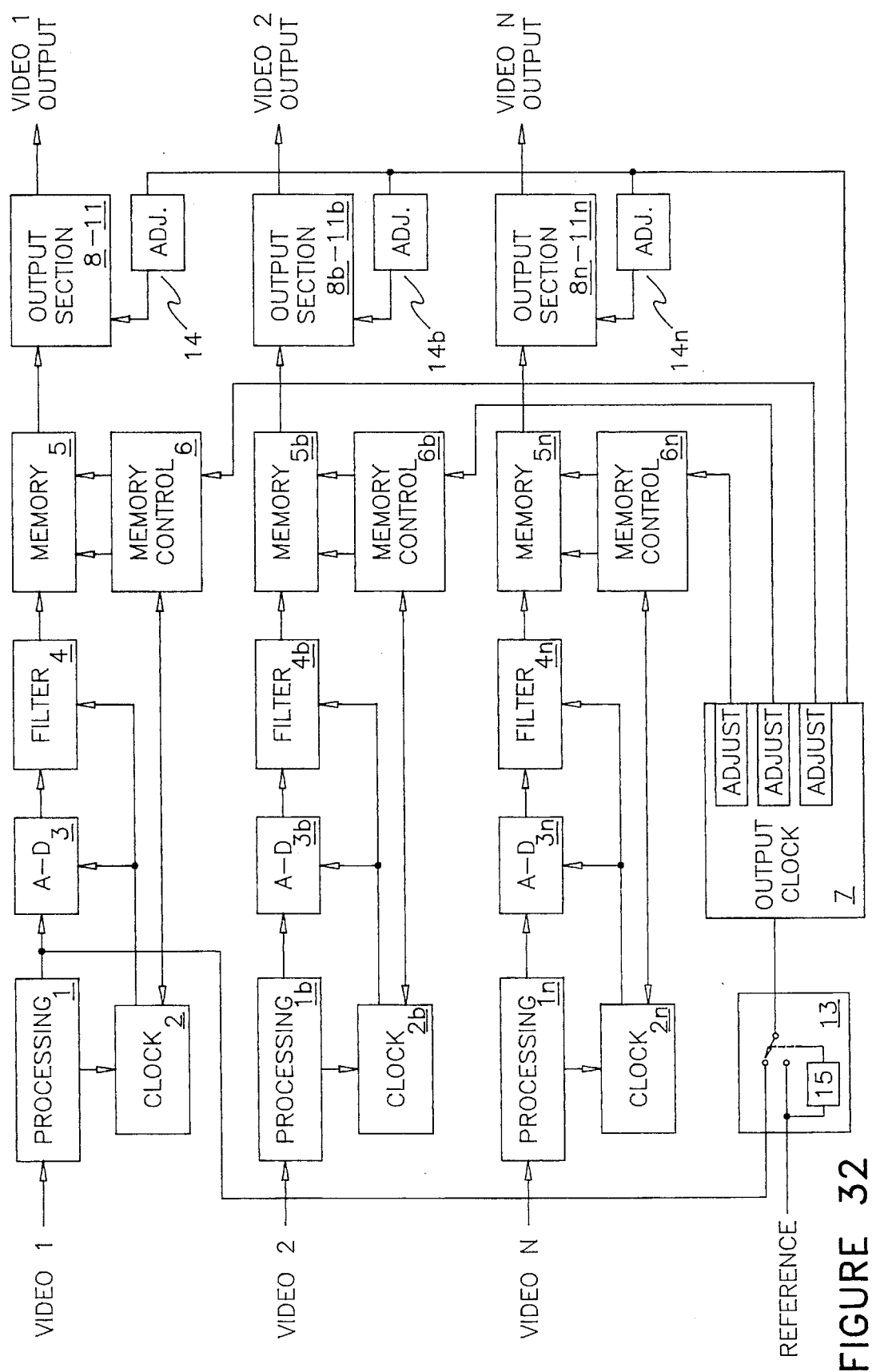
FIG. 32 is a block diagram of a plurality of synchronizers which share a common output clock circuit.

FIG. 32 shows a block diagram of a common reference selector 13 and output clock section 7 utilized with a plurality of video signal paths of FIG. 1. The clock and timing signals from 7 are coupled via individual adjustment controls to individual video signal paths consisting of elements 1, 2, 3, 4, 5, 6, and 8–11 all corresponding to the same numbered elements of FIG. 1. The individual adjustments of 7 correspond to the H & V phase and 14 to fine video phase adjustments of FIG. 1 thus allowing these parameters of each video output to be individually adjusted. The detailed changes necessary to convert the embodiment of FIGS. 1–31 to the embodiment of FIG. 32 will be realized by and the construction thereof within the capability of one of ordinary skill in the art from the teachings herein.

It will be noted that the memory control 6 has an output labeled DDO (digital delay output). This is a control signal which has a high period corresponding to the delay time of the video in the memory 5. This signal is used to drive a companion audio synchronizer to cause the audio portion of the program to be delayed by an amount equal to the video delay so as to avoid lip sync errors which would otherwise arise due to the video delay. Such devices are described in U.S. Pat. Nos. 4,313,135 and 5,202,761.

The interpolation filter 4 is a quite novel and useful feature of the invention. The net result of the operation of the interpolation filter 4 is to allow video to be sampled at a first data rate and resolution, and converted to video at a second data rate and the same or different resolution. Such will be useful where data rate is traded off for resolution, or vice versa. The forward case of trading speed for resolution is somewhat comforting, since with explanation, many of those skilled in the art can realize that by using or combining a number of samples of a first precision, a lower number of samples of a second higher precision may be obtained. Simply averaging two samples to create one sample is a simple example. In the process, an extra bit or so of resolution is achieved.

It is not so comforting to consider the case where the opposite takes place, namely where a first number of samples of a first precision are used or combined to obtain a larger number of samples of the same or another precision. Such operation may very well be desirable, for example to interpolate a relatively low number of samples taken at one standard, and converting to a higher number of samples. Converting from sampling at 3 times subcarrier to 4 times subcarrier would be an example where this would be useful.

While it normally would be expected that in performing a conversion to increase the number of samples by interpolation or other means, the effective resolution of the resultant samples would be decreased, this does not need to be the case. When signals are properly sampled at any precision at Nyquist rates or above, it is quite possible to convert from one sample rate to another by means of digital filtering and increase the precision at the same time, whether increasing or decreasing the sample rate. The reason for this resides in the nature of the sampling and digitization errors resulting from the quantizing process. It will be recalled that averaging of two similar samples of a signal results in a 3 Db reduction in random noise, since the signal always adds but the noise, being random, only adds part of the time, and sometimes cancels. Such can be used to advantage in converting from one sample rate to another, since by combining multiple samples a corresponding noise reduction in an amount related to the coefficients of the samples of the combination takes place. This holds true even if the output sample rate is lesser or greater than the input.

It can thus be understood from these teachings that the digital interpolator filter 4 may be used to advantage to improve the quality of the digitized video beyond that provided by the A/D, for any combination if input and output data rates, owing to the use of multiple input samples to generate each output sample. It should also be noted that these teachings also apply to analog sampled systems, where sampling is performed and the samples are utilized in analog form but the samples are degraded or reduced in accuracy. One example of such an application is CCD (charge coupled device) and BBD (bucket brigade device) technology where analog samples are taken and shifted along analog shift registers, but wherein the sample accuracy is limited by the quality of the shift registers. Such technologies are well suited for implementing various other functions of the present invention, including the digital filter and the memory sections.

Figure 2A:
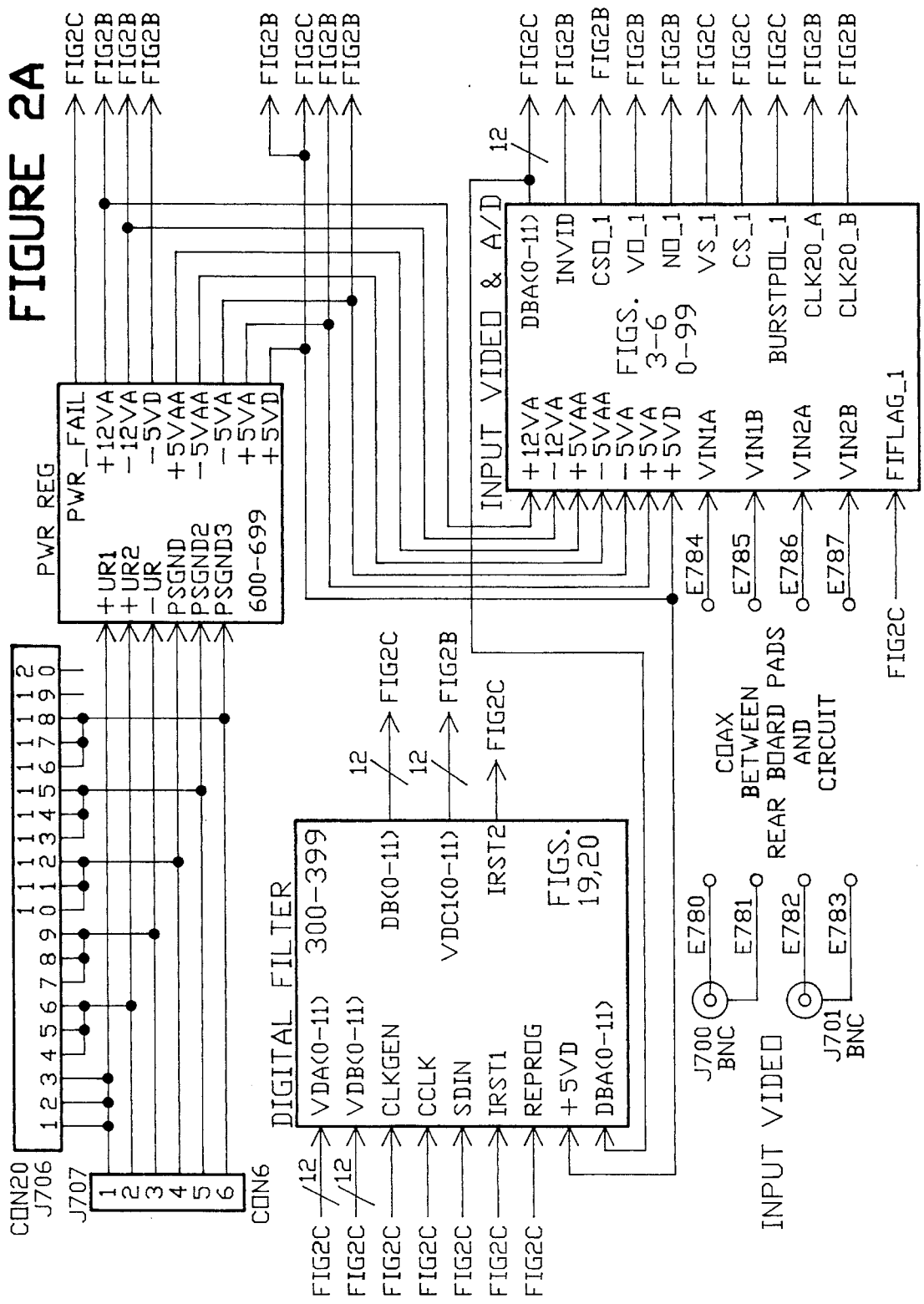
FIG. 2 is a top level schematic diagram of the remaining schematic diagrams of the preferred embodiment of the invention.

FIG. 2 is a top level schematic diagram of the remaining schematic diagrams of the preferred embodiment of the invention. It shows a power regulator section in the upper left labeled 600–699 which receives raw AC power and provides regulated DC power as is well known in the art. Regulated DC power is then supplied to the other sections of the schematic.

The Input Video and A/D sections of the schematic are shown in the central left, labeled 0–99. These schematic sections correspond roughly to elements 1–4 of FIG. 1. This circuit is shown in more detail in FIGS. 3–6, and the interconnection of these circuits with the other circuits is shown.

The Memory Timing and Control sections of the schematic are shown in the middle, labeled 100–199. This circuit is shown in more detail in FIGS. 7–10, and the interconnection of these circuits with the other circuits is shown. These schematic sections correspond roughly to element 6 of FIG. 1.

The Memory sections of the schematic are shown in the right, labeled 200–299. This circuit is shown in more detail in FIGS. 11–18, and the interconnection of these circuits with the other circuits is shown. These schematic sections correspond roughly to element 5 of FIG. 1.

The Digital Filter sections of the schematic are shown in the upper middle, labeled 300–399. This circuit is shown in more detail in FIGS. 19 and 20, and the interconnection of these circuits with the other circuits is shown. These schematic sections correspond roughly to element 9 of FIG. 1.

The D/A and Output Video sections of the schematic are shown in the upper right, labeled 400–599. This circuit is shown in more detail in FIGS. 21–28, and the interconnection of these circuits with the other circuits is shown. These schematic sections correspond roughly to elements 7, 13, 12, 8, 10, and 11 of FIG. 1.

FIG. 2 also shows chassis connectors, jumpers and other miscellaneous portions of the preferred embodiment of the invention.

Figure 3A:
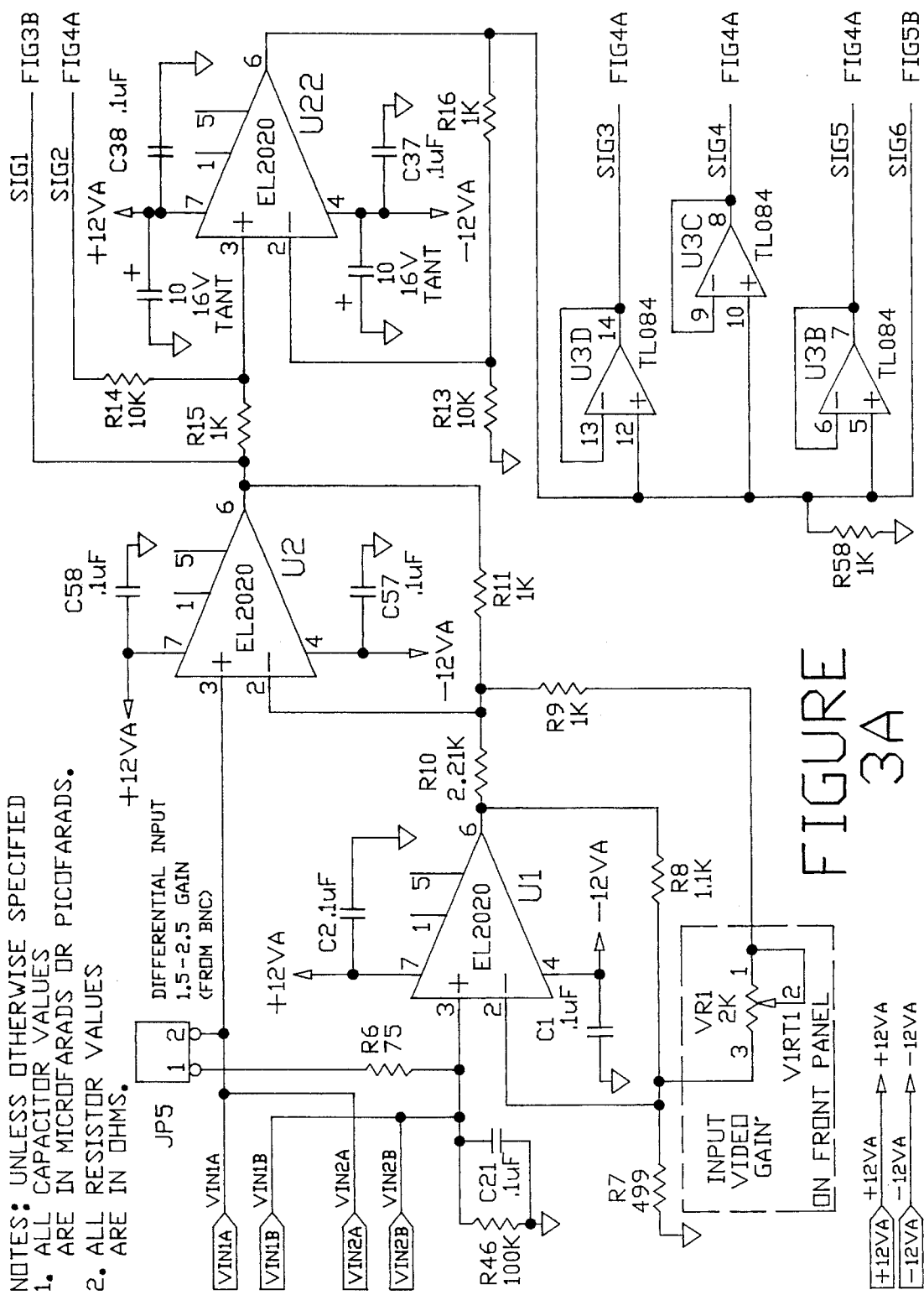
FIG. 3 is a first section schematic diagram of the Input video and A/D sections of the preferred embodiment of the invention.

FIG. 3 is a first section schematic diagram of the Input video and A/D sections of the preferred embodiment of the invention. It shown the differential video input in the upper left of the page, with the input video buffers U2 and U22, Internal buffers U3D, U3C and U3B, and coarse sync stripper comprised of U3A, U5D, U5A and U12A which provides TTL level sync out at pin 12 of U12A.

The Coarse Sync Stripper operates as a modified sync tip clamp circuit. The video is coupled through C3 and buffered by U5D. When the sync tip is pulled negative by R12, U5A operates as a comparator causing the output on pin 12 to go positive thus injecting current into C3 via the two diodes D3. Two diodes are shown to achieve a 1.2 volt drop thus U5's output during sync tip is +1.2 volt. During video, U5's output is −1.2 volt, owing to the action of the two diodes D4. This action provides a limited sync signal which is coupled to comparator U12A and converted to TTL. Buffered video from U5D is coupled to the reference input of U12A. This novel and unconventional circuit thus provides a coarse sync stripper having fast speed and considerable noise immunity owing to the fact that when there is little noise on video switching of the comparator is effected during the near simultaneous transitions of the sync edges on the two inputs of U12A, and during noise, the slew rate of U5A prevents noise from entering into the + input of the comparator, thus providing a large amount of hysteresis with respect to the noise.

Figure 4B:
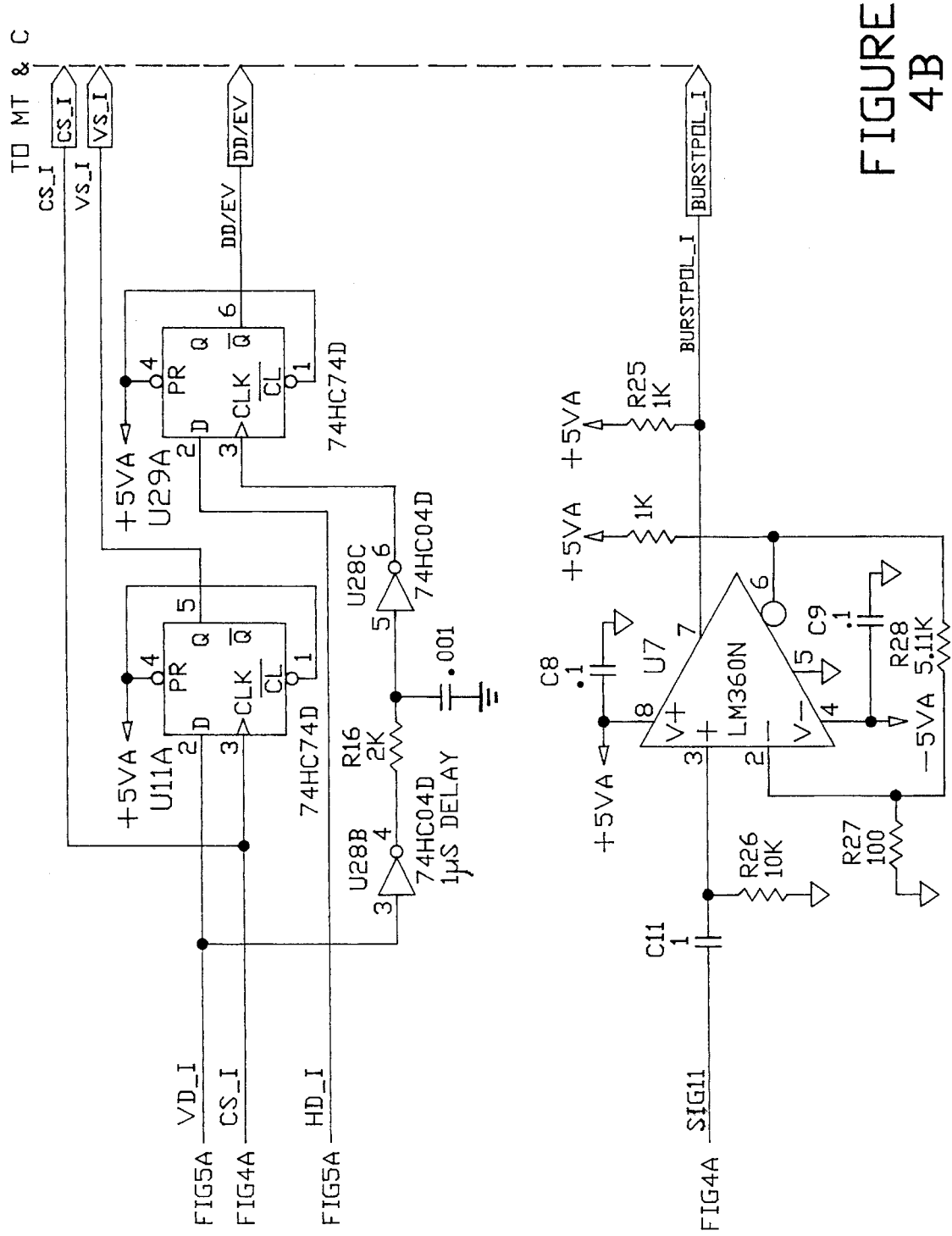
FIG. 4 is a second section schematic diagram of the Input video and A/D sections of the preferred embodiment of the invention.

FIG. 4 is a second section schematic diagram of the Input video and A/D sections of the preferred embodiment of the invention. TTL sync from U12A is applied to pins 9 and 11 of U8. The sync edges are differentiated by C34/R1 and C35/R23 to form sampling pulses which are coupled to two sections of analog switch U10. Analog switch U10 samples video on pins 14 and 15 at sync tip and blanking and couples these sample values via pins 13 and 1 to hold capacitors C22 and C23, which are buffered by U5B and U5C. The resistor divider R18 and R19 thus provides a DC voltage to pin 2 of U6 which corresponds to ½ of sync amplitude. Video is coupled from U3D thru low pass filter R52 and C55 to comparator U6 which compares the video to the reference set at half sync tip, thus providing a precision TTL sync signal at outputs 6 and 7.

In addition, one shot U9A provides a sample pulse which is coupled to the third section of analog switch U10. The sample pulse causes the switch to sample video during back porch which sample is present at pin 4. The back porch sample is integrated by U24D, which integrator has a reference voltage established by VR2 and U24A coupled to pin 12. The voltage out of integrator U24D is coupled back to the video via R14 (FIG. 3) thus serving to regulate the clamping of video at the DC voltage set by VR2. This circuit thus operates as a DC clamp to clamp the video to the reference level set by VR2. When Sync and blanking are inserted in video at the output, VR2 becomes a video offset adjustment.

Composite video from precision stripper U6 is coupled to D flip flop U11A where it latches vertical drive to provide a timed vertical drive signal VS_I for the memory control. In addition, vertical drive is delayed by 1 μs in U28B&C, and used to clock H drive in U29A to provide the field flag OD/EV also for use by the memory control.

Figure 5A:
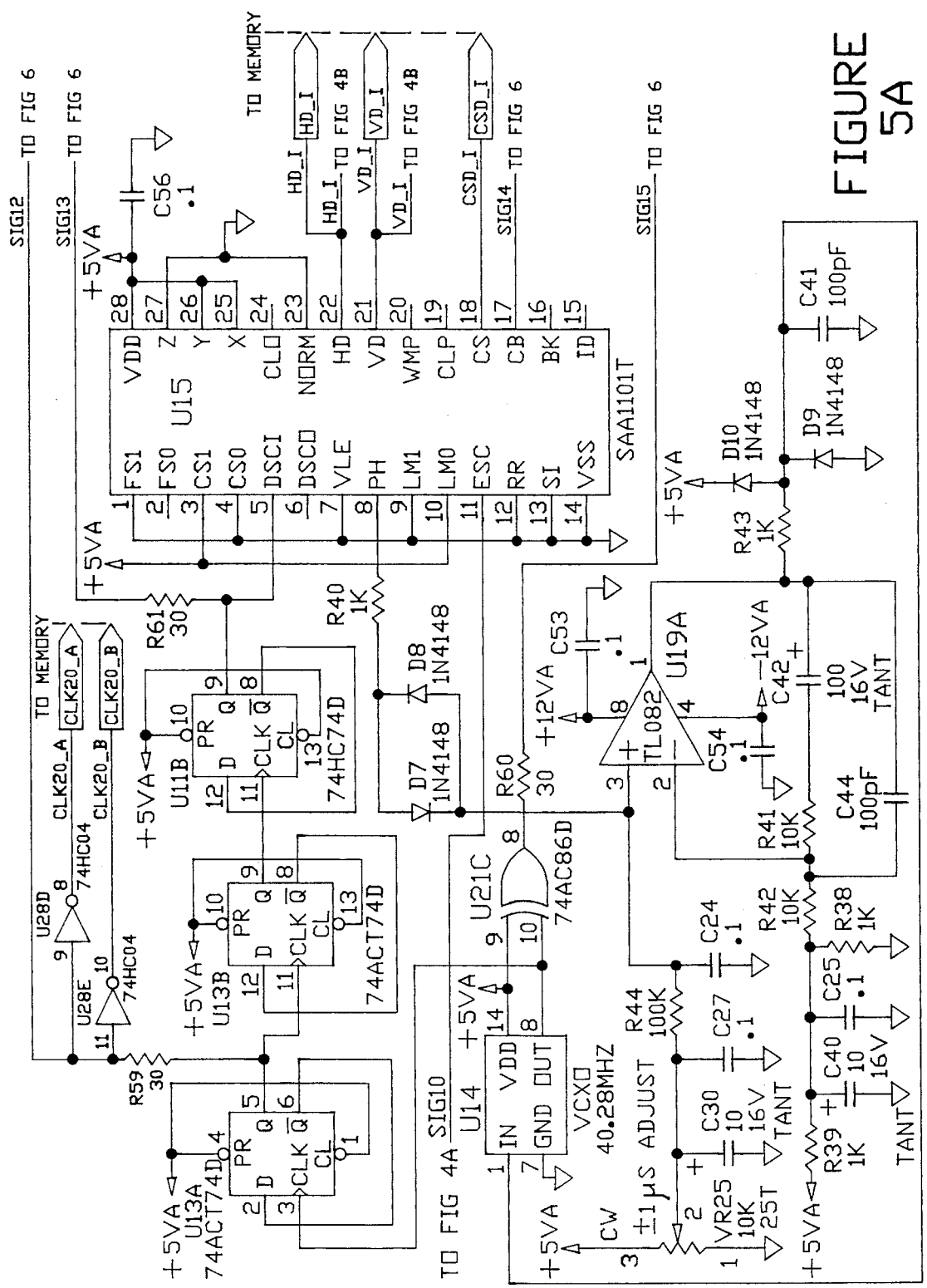
FIG. 5 is a third section schematic diagram of the Input video and A/D sections of the preferred embodiment of the invention.
Figure 5B:
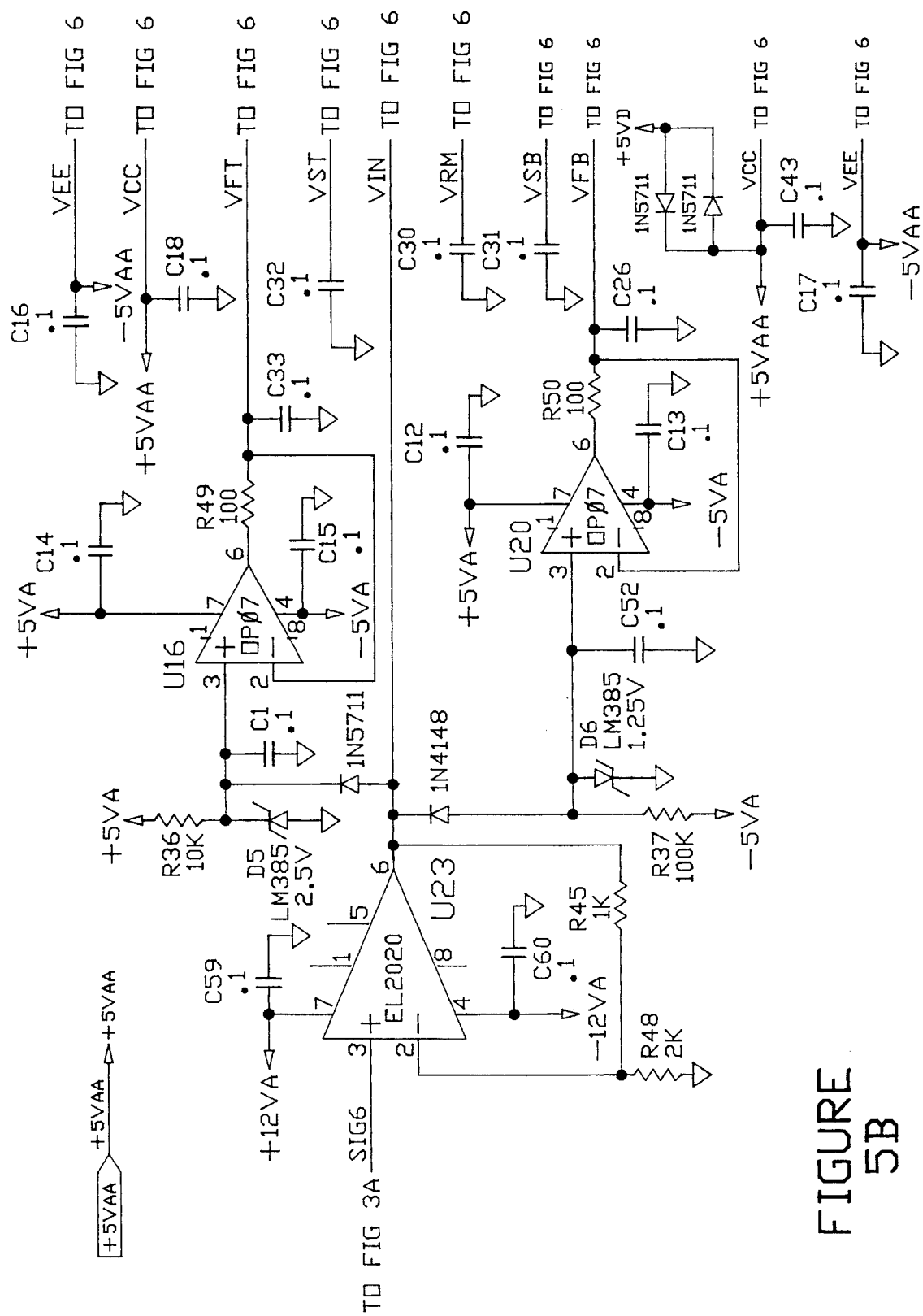

FIG. 5 is a third section schematic diagram of the Input video and A/D sections of the preferred embodiment of the invention. Master input clock is provided by VCXO U14 at ≈40 Mhz, which clock is phase locked to video H sync at 2560 times H. The clock is divided to 5 MHz by U13 and U11B (320 H) and coupled to sync generator IC U15 on pin 5. Input comp sync from the precision comparator is coupled to U15 on pin 11. U15 provides a phase comparison between input comp sync and its own comp sync and provides an error voltage out from pin 8. The error voltage is integrated in U19A and the integrated error voltage is coupled to frequency control pin 1 of VCXO U14. The generated sync signals output from U15 are thus caused to be phase locked to input video at the aforementioned 2560 times H. An error current is injected into the error integrator via VR25 providing horizontal phase adjustment of the PLL.

Figure 6:
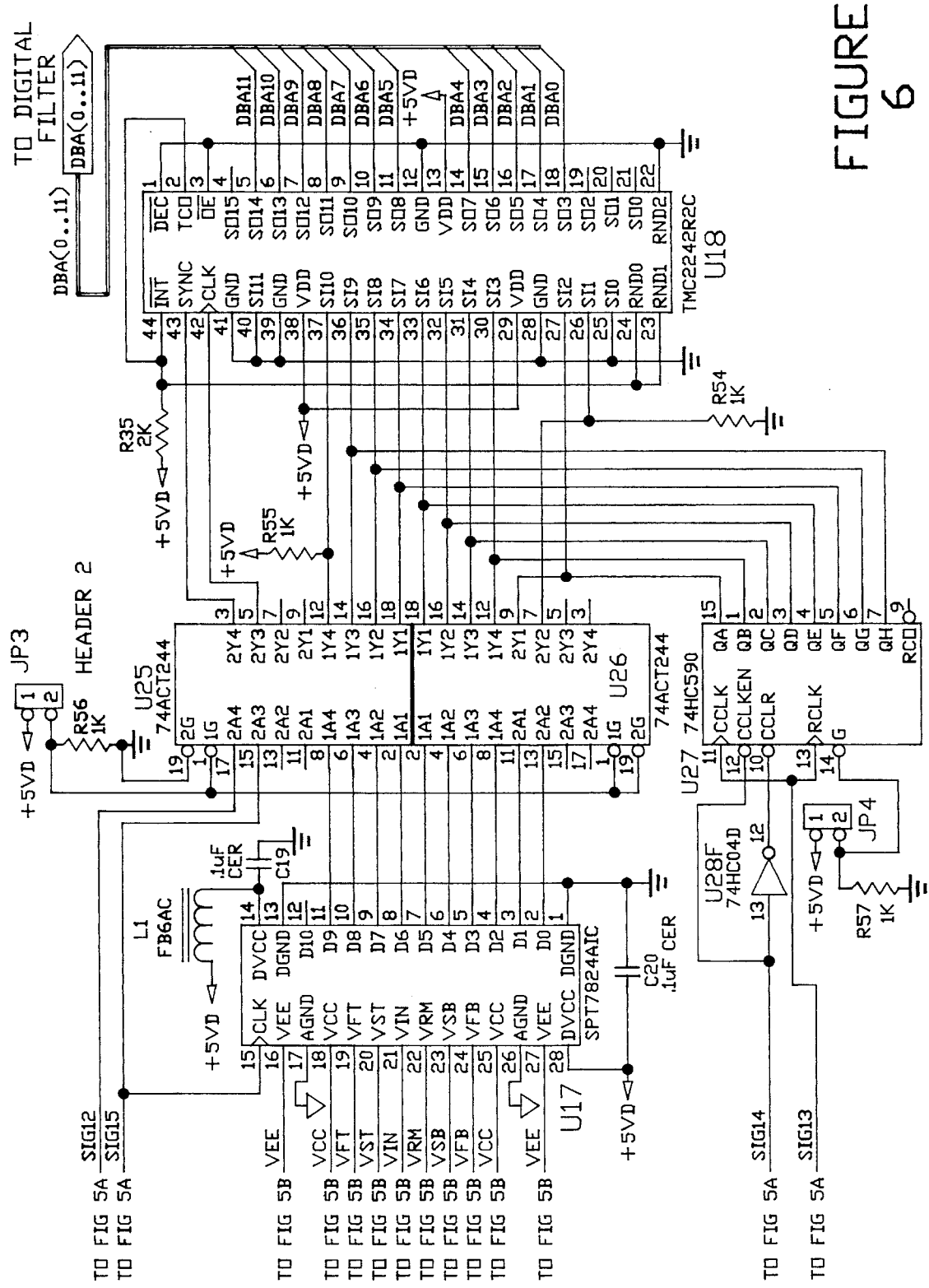
FIG. 6 is a fourth section schematic diagram of the Input video and A/D sections of the preferred embodiment of the invention.

DC reference voltages are provided by D5 and D6, are buffered by U16 and U20 and coupled to the A/D convertor U17 (FIG. 6).

FIG. 6 is a fourth section schematic diagram of the Input video and A/D sections of the preferred embodiment of the invention. A/D convertor U17 receives DC restored input video at pin 21 and 40 MHz clock at pin 15, digitizes the video and provides digitized video of 10 bits resolution and 40 MHz data rate at the outputs pins 2–11. The output of the A/D is buffered by tri state buffers U25 and U26. In addition, an 8 bit counter U27 is coupled into the digital video data path at the output of the buffers. The counter may be enabled and the buffers disabled by installing Jumpers JP3&4, thus providing a test ramp for testing subsequent circuitry.

The 40 MHz 10 bit sampled digital video is coupled to the input of U18, which is configured to interpolate by a ratio of 2:1 to provide 12 bit resolution digital video at a 20 MHz rate. The 12 bit digital video is coupled to the digital filter header shown on FIG. 19.

Figure 7:
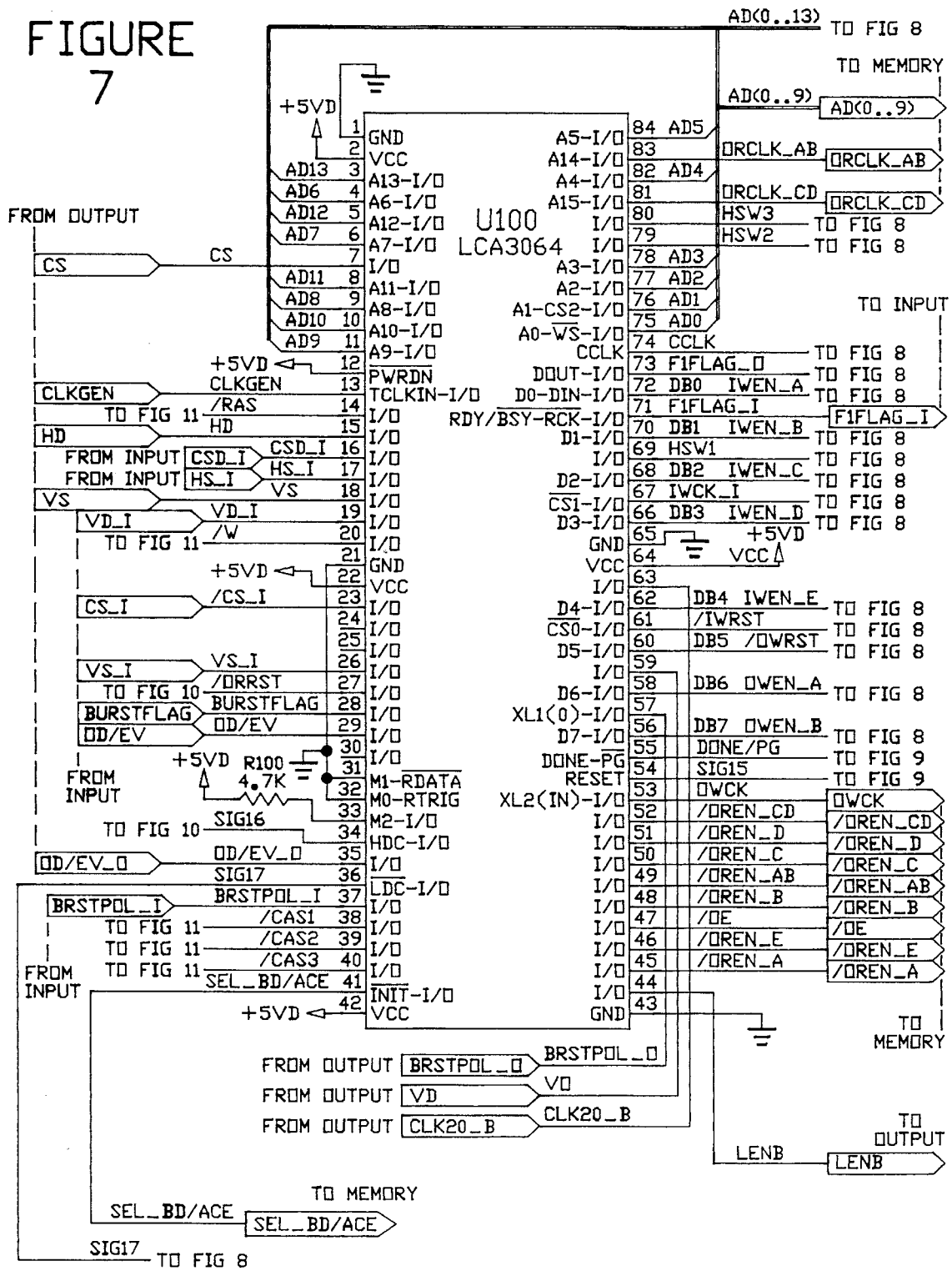
FIG. 7 is a first section schematic diagram of the Memory Timing and Control sections of the preferred embodiment of the invention.
Figure 8:
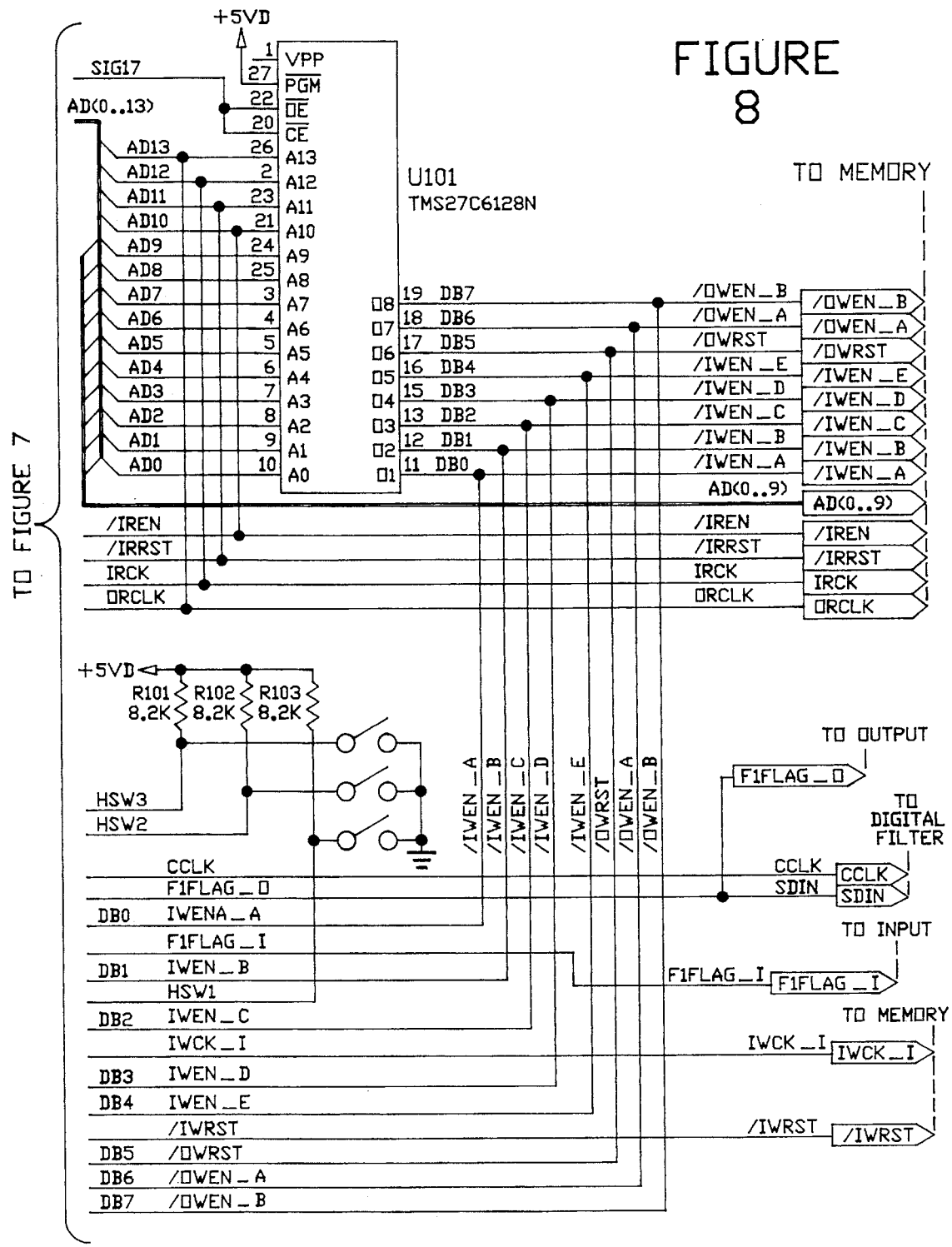
FIG. 8 is a second section schematic diagram of the Memory Timing and Control sections of the preferred embodiment of the invention.

FIG. 7 is a first section schematic diagram of the Memory Timing and Control sections of the preferred embodiment of the invention. The bulk of these functions is performed inside a programmable gate array U100 manufactured by XILINX. This gate array receives various timing signals such as comp sync, H drive, V drive, burst flag, even/odd field and burst polarity from the input and output video and PLL circuits. The IC generates memory address and timing information for the write port and two read ports of the memory. This timing information includes FIFO controls, as well as RAS, CAS, WRITE and Out Enable for the DRAMS used in the memory circuit. Other miscellaneous timing signals used by the input, output and digital filter are also provided. The configuration of the XILINX gate array is stored in EPROM U101 (FIG. 8).

From the teachings herein, it will be recognized by one skilled in the art that the Memory is configured in a five cell array, 12 bits deep. The 8 MSBs of the 12 bit data are written one byte at a time into five input FIFOs U205–U209. The 4 LSBs of the 12 bit data are time multiplexed by ICs U200 and U201 into 2 8 bit words and one four bit words, which are coupled to input FIFOs U202, U203 and U204, respectively. Every 5 clock cycles, one byte from each of the FIFOS, for 60 Bits corresponding to five 12 bit samples, are written into memory. During the same time period, up to two 60 bit reads may be performed, one each into the two lower sets of FIFOs. Thus the memory may provide continuous writing of one 12 bit 20 MHz video input (port) and simultaneous continuous reading of two 12 bit 20 MHz video outputs (ports). In the preferred embodiments, the two memory read ports are reading data from the same point on the image, but separated by one picture period in time 4 fields in NTSC and 8 fields in PAL. The two picture period separated output video streams are used by the noise reducer to provide noise reduction as described in U.S. Pat. No. 4,305,091. By changing the timing of the second read port of the memory, a second video stream having any desired timing with relation to the first video stream may be obtained. In this fashion, alternate configurations of noise reduction and image enhancement may be obtained, for example as described in U.S. Pat. No. 4,573,070.

The video signal is sampled at 2560 times H, thus providing 2560 samples of 10 bit accuracy. Interpolation is used to derive 1280 samples of 12 bit accuracy from the 2560 samples. Since the memory is divided into 5 cells, the 1280 samples will be stored into 1280/5 memory address locations which results in an easy to work with 256 memory addresses which require 8 bits of address. By using 4 meg DRAMs which are configured to each handle 4 bits of data, (i.e. 1M×4) 10 address bits each for RAS and CAS are needed. By using 8 of the 20 total address bits for storing 256 groups of 5 samples for each line of video, 12 bits are left for storing lines. The 12 line address bits provide 4096 lines of storage capability, which is more than enough for storing 8 fields of PAL video or 2500 lines (8×312.5). There is some unused memory, however memory is relatively inexpensive when compared to state machines and counters, and trying to use memory more efficiently would actually require the use of more smaller memory ICs with a resulting increase in cost due to additional PC board space and complexity in generating address counters.

The memory thus contains adequate storage for storing a full picture period of PAL or NTSC video, and can also be configured for other scanning rates, such as 768, 1050 or 1250 line HDTV. In NTSC, the memory can in fact store two complete picture periods of video. Having excess memory, for example two picture periods of storage in NTSC, is very useful in allowing one complete picture period to always be present in memory for uninterrupted reading, while another is being stored. In the event the writing is interrupted or disrupted due to loss of input, noisy input, etc., the complete picture period already in memory may be repeated as needed (frozen) during the pendency of the disruption until proper writing has resumed and a new full complete picture period is stored. This feature is implemented in the NTSC version EPROM program discussed below.

In PAL, it is possible to use the extra memory, even though it is not a full picture period, to provide a buffer between reading and writing to provide the same protection from disrupted inputs. Unfortunately, due to the lack of a full picture period of additional memory, in the event of a disruption the repeated picture period may need to be comprised of segments of two different picture periods, for example a new field 1-3 and an old field 4-8, whereas in NTSC the four fields can always be from the same picture period.

In the preferred embodiment it is preferred that the 8 bits of memory address for storage of lines of samples be combined with 2 bits signifying the frame to give 10 bits of CAS. In this fashion, fast CAS memory addressing may be used throughout the line of video. The input FIFOs are then used to store an entire line of video samples and when that line is complete the next available memory write cycle is used to store the entire line into memory at a RAS address corresponding to the line number of the video. The frame number will be carried on two of the CAS addresses. Read cycles are similar, and reading two lines of video which are integral numbers of fields apart may be performed during a single RAS cycle since the RAS address for both lines will be the same. This feature is very useful for reading the two output ports one picture period apart.

It should be noted that the memory configuration will support one more DRAM IC, U219A (FIG. 16), than is shown in use on the schematic, since only 4 bits of input data are coupled to U204. Instead of using this memory DRAM (U219A), it was chosen in the present embodiment that the other four bits of the corresponding write FIFO be used for convenience for timing and control signals which are passed and stored in the FIFO along with the video. It will be recognized that these timing and control signals. Input H reset, Input H Drive, Input V Drive and Input Comp Sync are not presently stored in a memory IC, but are taken at the output of the FIFO for other use.

Alternately, these four bits of FIFO and memory capability may be used to store other signals related to the video, for example audio, test, time code or timings or may be used to store unrelated signals such as text, messages and data which are desired to be passed through the synchronizer. In such case, it is necessary to install the second memory IC U219A, and to interconnect this IC to the FIFOs as is shown, in correspondence to the upper memory IC, as will be apparent to one skilled in the art from viewing the Figures. The timing signals currently passed through FIFO U204 would then be passed through another FIFO having all control signals wired in parallel with U204. The extra four bits of memory capability which is provided with this novel memory configuration of the preferred embodiment synchronizer is quite useful in emerging video and television systems for the passing of one or more related or unrelated secondary signals with the video signal in order to maintain separate parallel but time related transmission paths for the two signals. The second signal path of course is digital in nature, and if the desired secondary signal(s) are in analog form, Analog to Digital conversion and time multiplexing into a 4 bit 4 MHz data stream will be required, as will be known to one skilled in the art.

It will be seen that input video data of 12 bits resolution and 20 MHz clock rate, is time multiplexed by 5 and stored in the memory array via the input FIFOs. Alternatively, it may be described as a memory array having a 60 bit resolution and a 4 MHz input data rate. In addition, the unused 4 bits of input FIFO U204 provide another 4 bit 4 MHz storage channel capability which is paralleled with the video memory and matched in time.

FIG. 8 is a second section schematic diagram of the Memory Timing and Control sections of the preferred embodiment of the invention. This Figure shows the EPROM U101 which stores the program information used to configure the programmable gate array U100 the memory control, and U300 (FIG. 20) the noise reducer gate array. The programming of these two devices is performed automatically upon power up of the devices. One skilled in the are will be capable of configuring these two gate arrays to perform the desired functions from the descriptions given herein.

The above programs are slightly different for use with NTSC and PAL standard signals and other video formats due to the 525 or 625 lines per frame affecting the address counters. When the synchronizer is configured for 625 line operation, it may also be utilized with SECAM signals.

Figure 9:
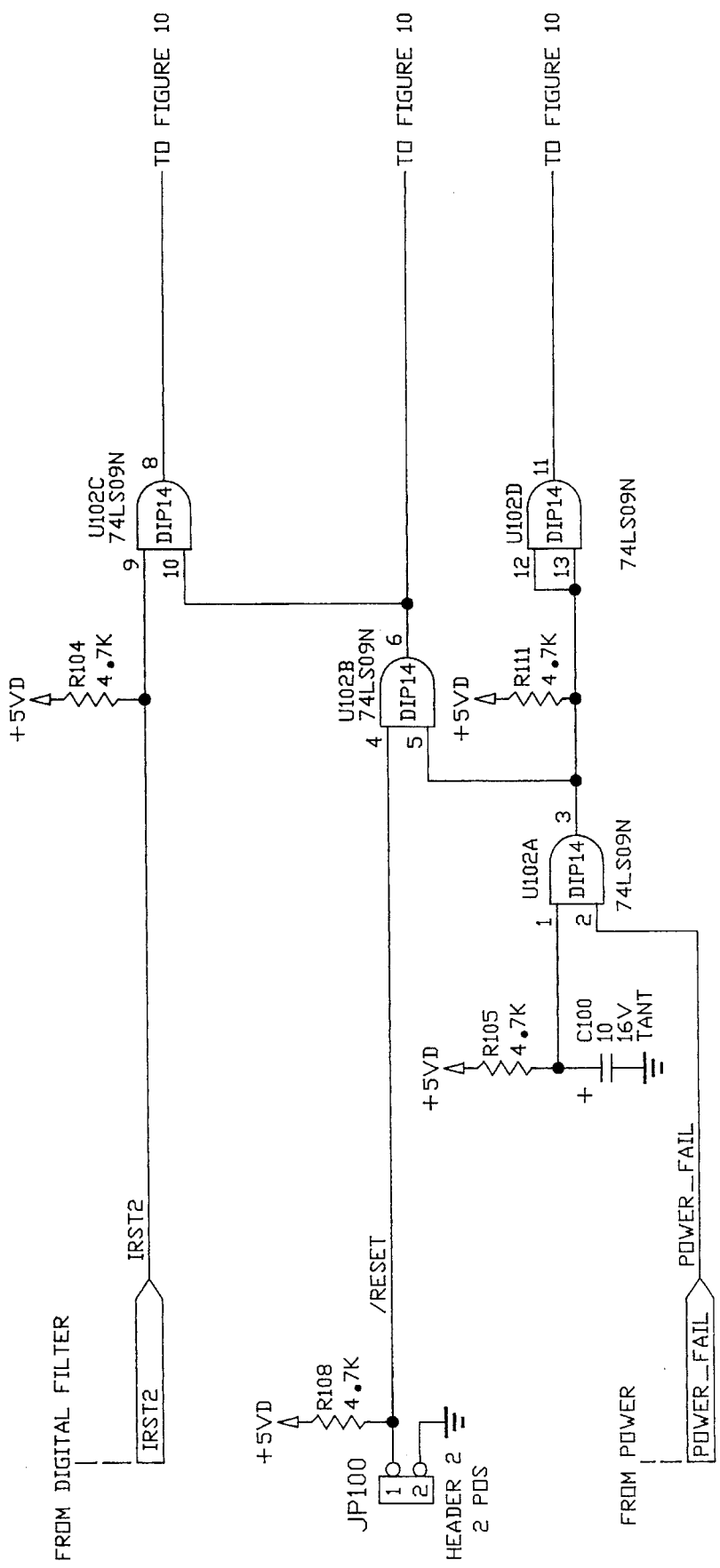
FIG. 9 is a third section schematic diagram of the Memory Timing and Control sections of the preferred embodiment of the invention.

FIG. 9 is a third section schematic diagram of the Memory Timing and Control sections of the preferred embodiment of the invention. This Figure shows the reset and power on logic used to cause the programmable gate arrays U100 and U300 to program automatically upon power on, thus loading one of the above programs into the arrays.

Figure 10:
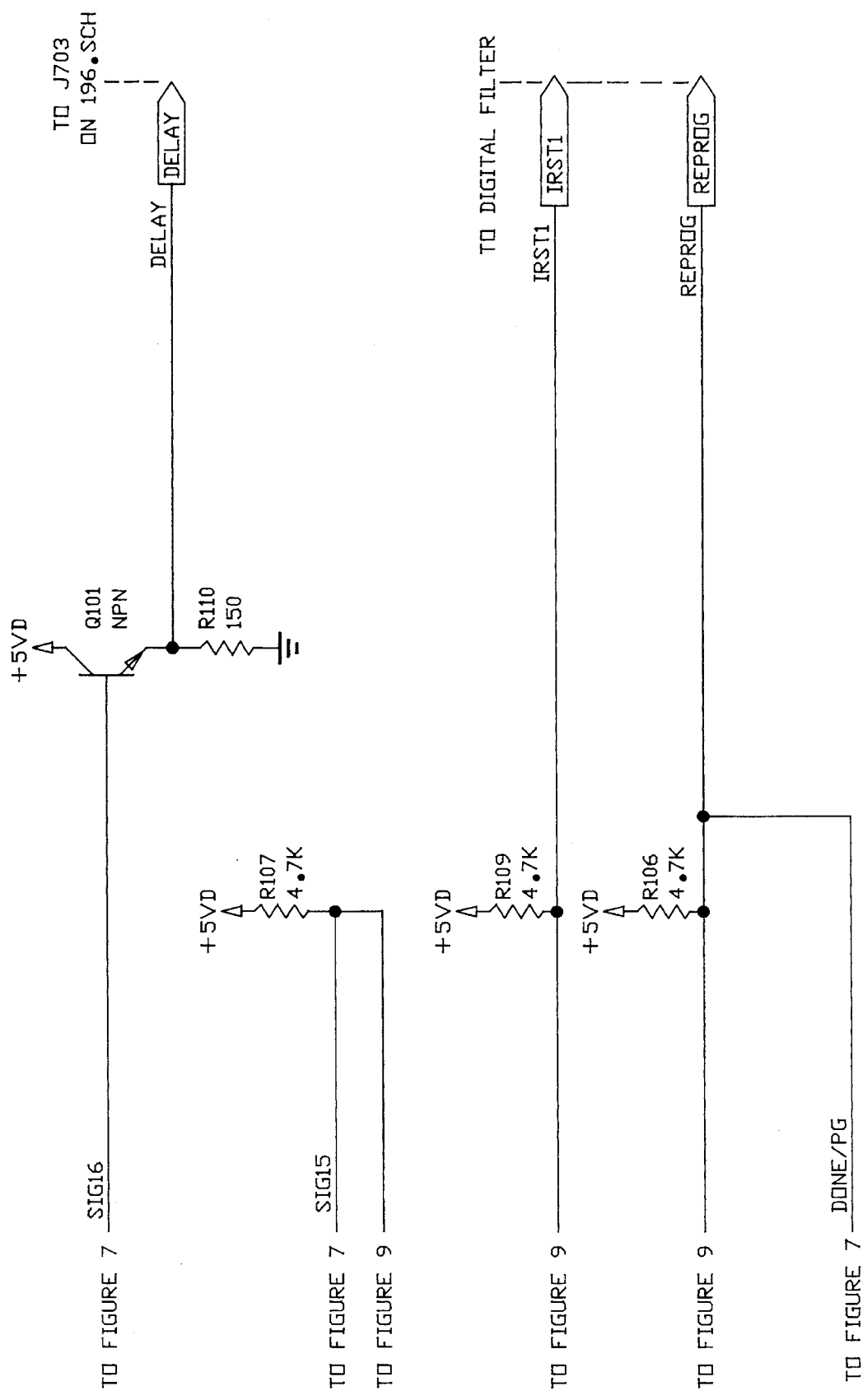
FIG. 10 is a fourth section schematic diagram of the Memory Timing and Control sections of the preferred embodiment of the invention.

FIG. 10 is a fourth section schematic diagram of the Memory Timing and Control sections of the preferred embodiment of the invention, showing further interconnections of the memory timing and control circuitry.

Figure 11:
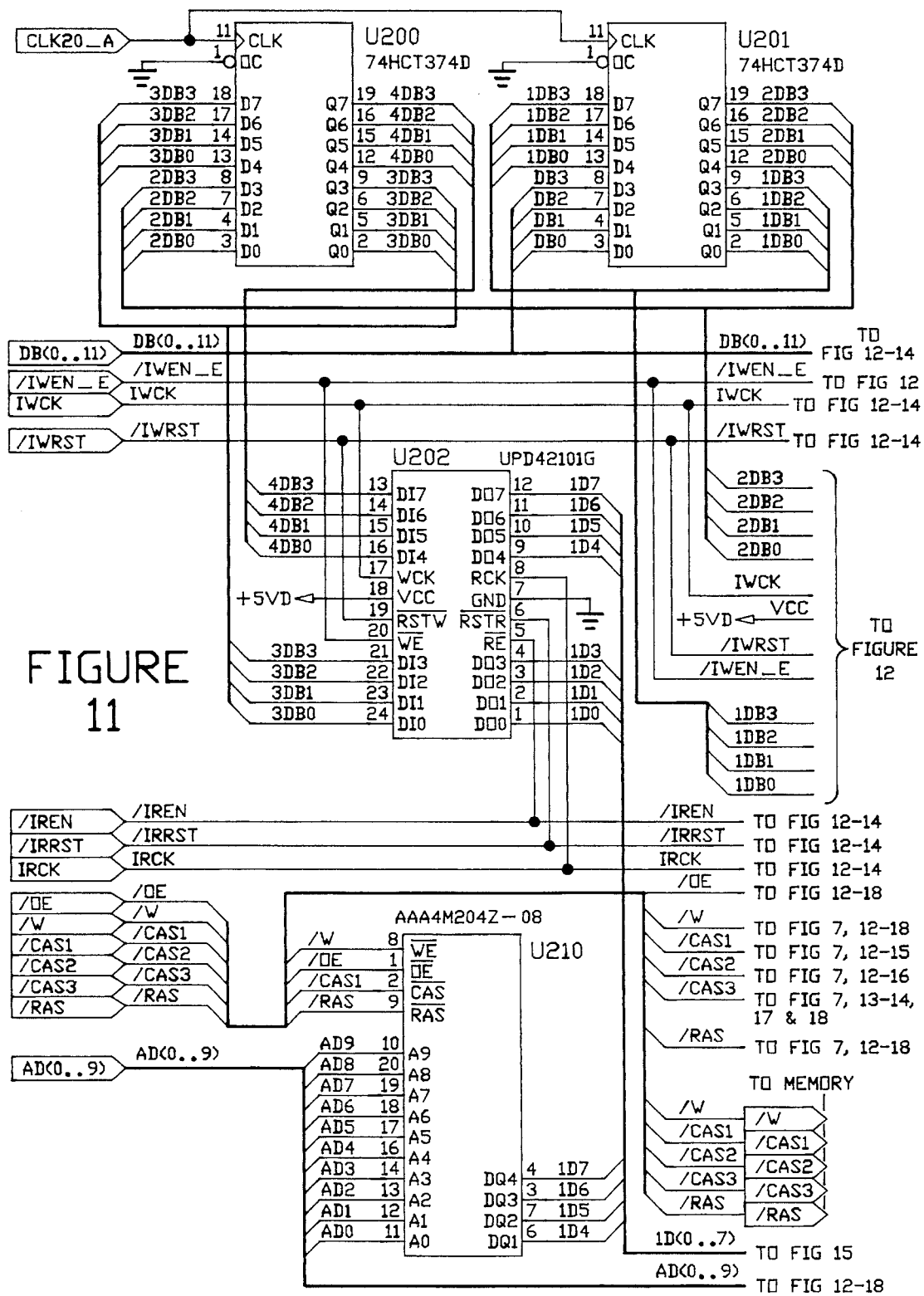
FIG. 11 is a first section schematic diagram of the Memory sections of the preferred embodiment of the invention.
Figure 12:
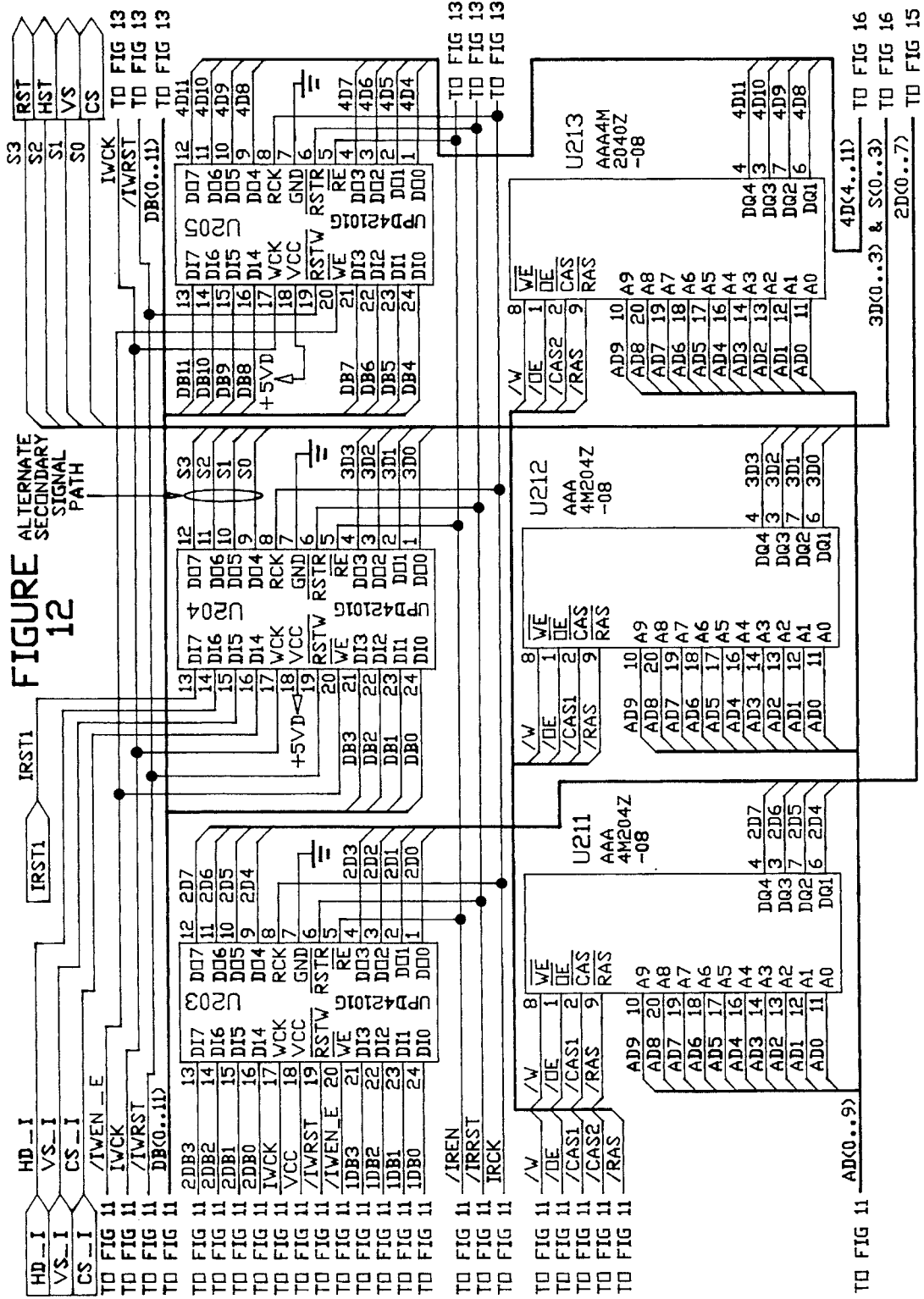
FIG. 12 is a second section schematic diagram of the Memory sections of the preferred embodiment of the invention.
Figure 13:
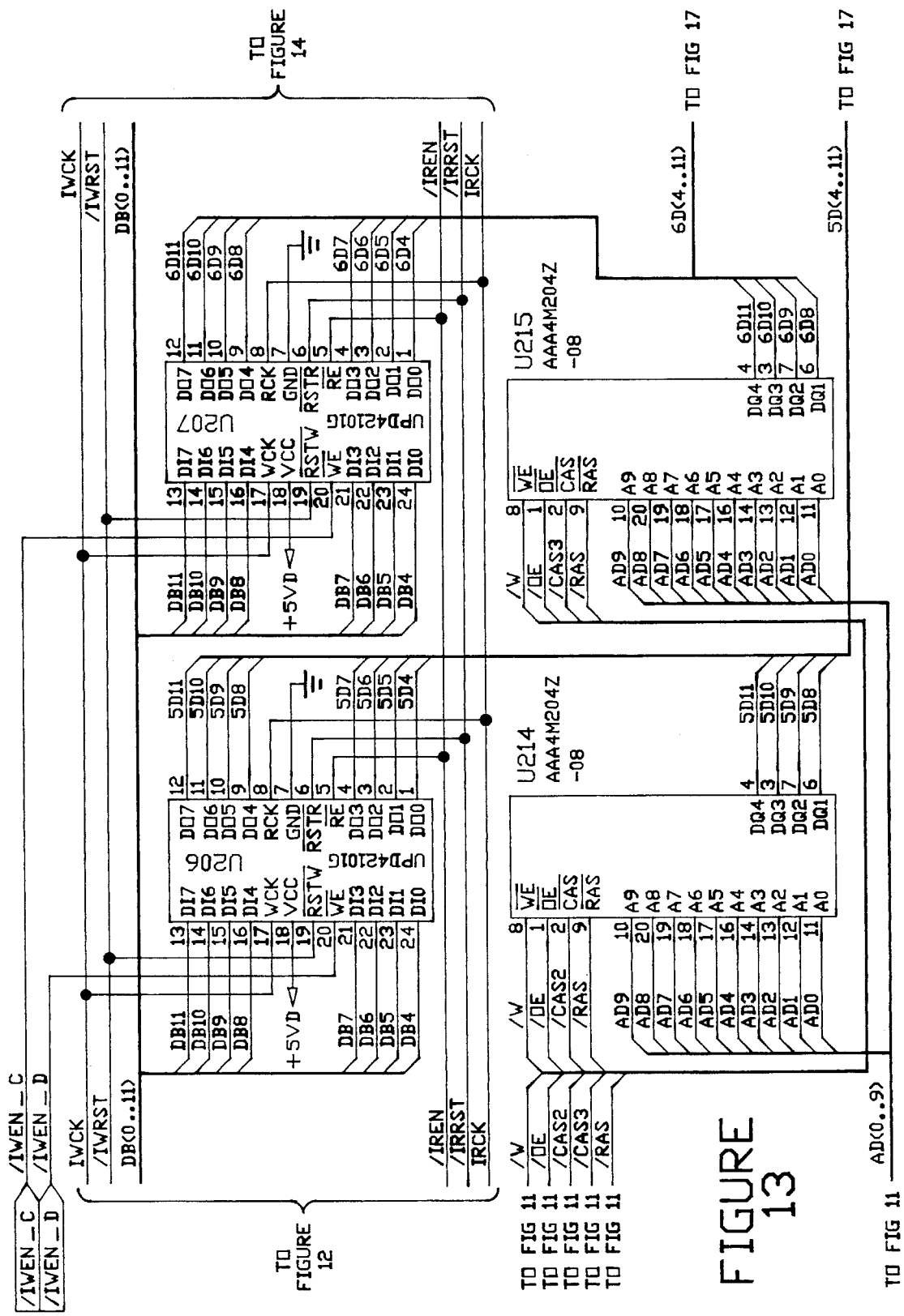
FIG. 13 is a third section schematic diagram of the Memory sections of the preferred embodiment of the invention.
Figure 14:
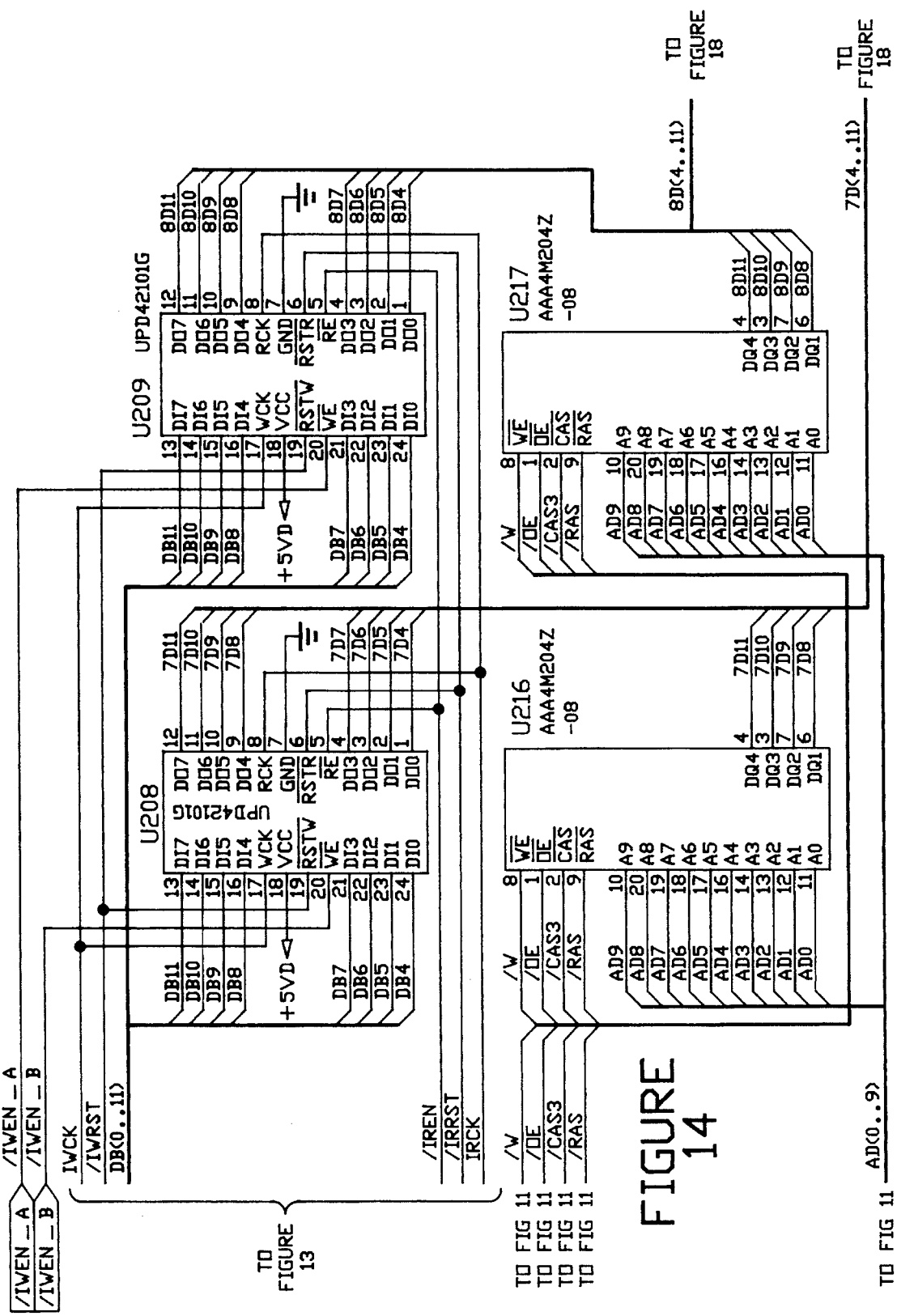
FIG. 14 is a fourth section schematic diagram of the Memory sections of the preferred embodiment of the invention.

FIG. 11 is a first section schematic diagram of the Memory sections of the preferred embodiment of the invention. This Figure shows the lower half (bits 0–3) of the first two memory cells consisting of a DRAM U210 (and U218 of FIG. 15) which is supported by an write port FIFO u 202 which in turn is supported by a parallel register U200.

FIGS. 12–15 show the second through fourth sections of the schematic diagram of the Memory sections of the preferred embodiment of the invention. These Figures similarly show on FIG. 12 the lower half (bits 0–3) of the second, third, fourth and fifth memory cells, and also on FIG. 12 half of the upper (bits 8–11) section of the first cell (U213), on FIG. 13 the upper section (bits 8–11) of the second and third cells, and on FIG. 14 the upper section (bits 8–11) of the fourth and fifth cells.

Figure 15:
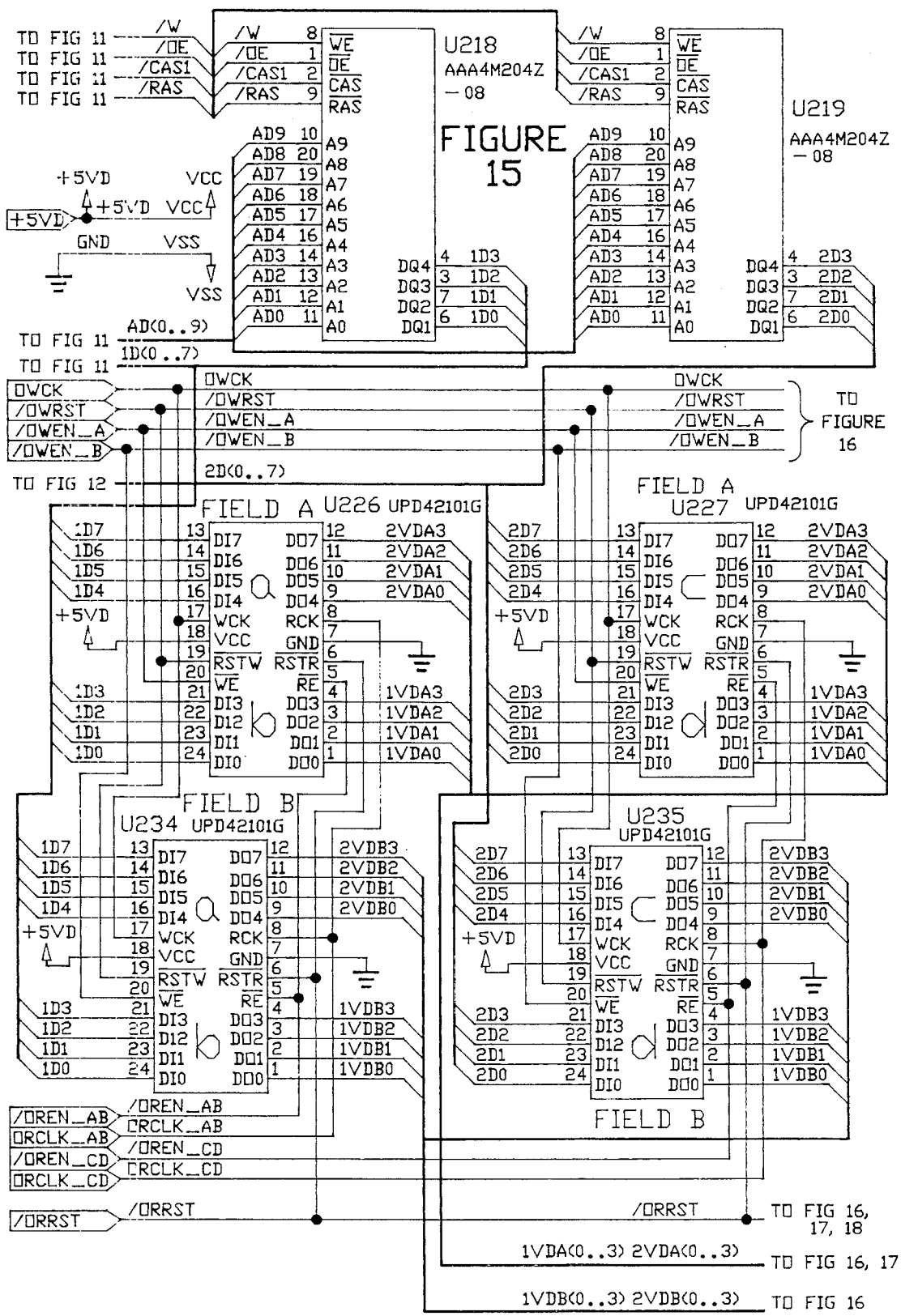
FIG. 15 is a fifth section schematic diagram of the Memory sections of the preferred embodiment of the invention.

FIG. 15 is a fifth section schematic diagram of the Memory sections of the preferred embodiment of the invention. Referring also to FIG. 11, it will be seen that FIG. 15 shows the second DRAM of the lower half (bits 0–3) of the first and second memory cells, U218 and U219, respectively, as well as the two read port FIFO's for each, U226 and U234 for cell 1 and U227 and U235 for cell 2.

Figure 16:
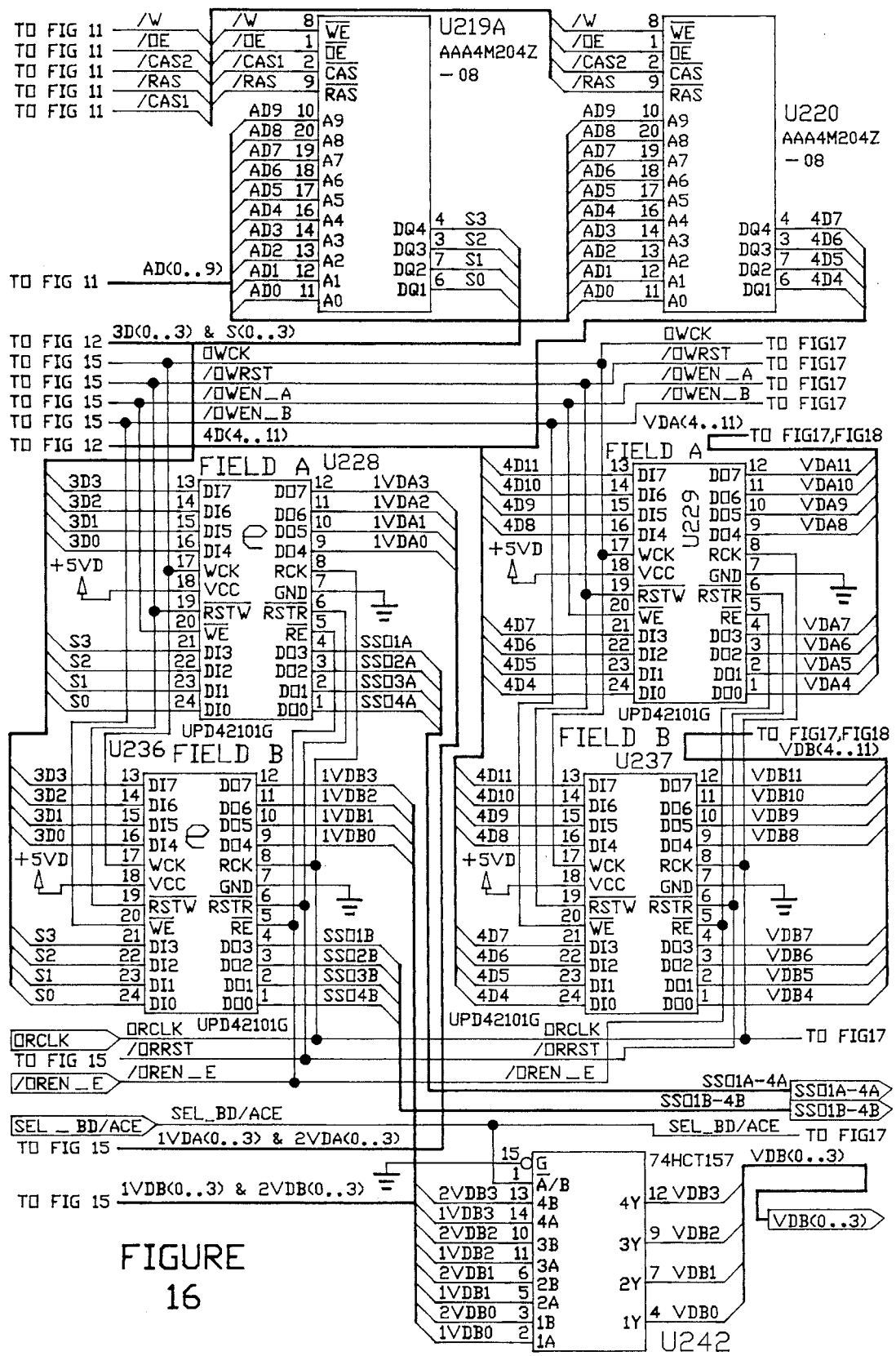
FIG. 16 is a sixth section schematic diagram of the Memory sections of the preferred embodiment of the invention.

FIG. 16 is a sixth section schematic diagram of the Memory sections of the preferred embodiment of the invention. This Figure shows the second DRAM comprising the lower half (bits 4–7) of the upper section of the first memory cell, U220 and the read port FIFOs for lower section cells 4 and 5.

Figure 17:
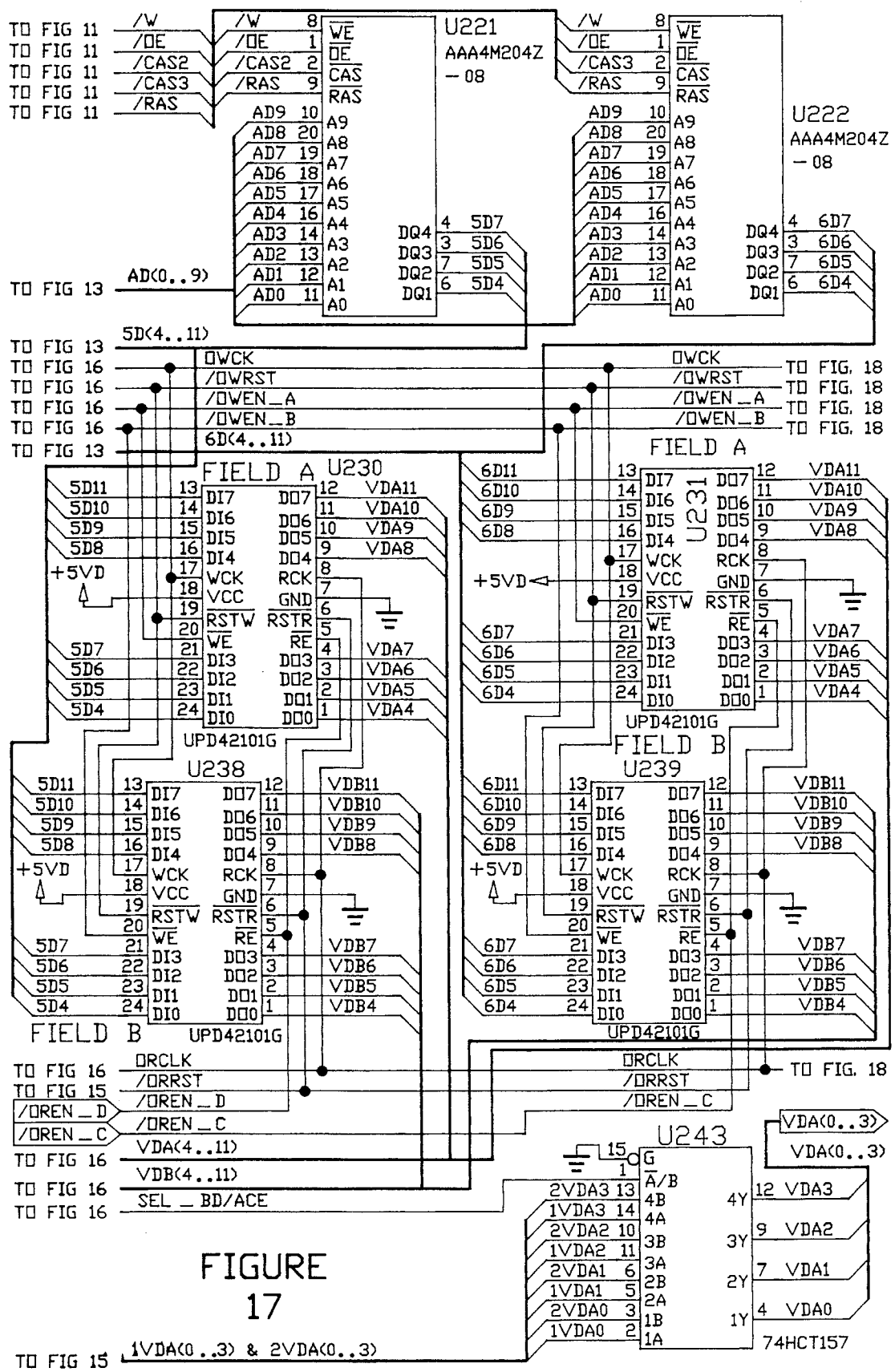
FIG. 17 is a seventh section schematic diagram of the Memory sections of the preferred embodiment of the invention.

FIG. 17 is a seventh section schematic diagram of the Memory sections of the preferred embodiment of the invention. This Figure shows the second DRAMs comprising the lower half (bits 4–7) of the upper section of the second and third memory cells, and the read port FIFOs for cells 2 and 3.

Figure 18:
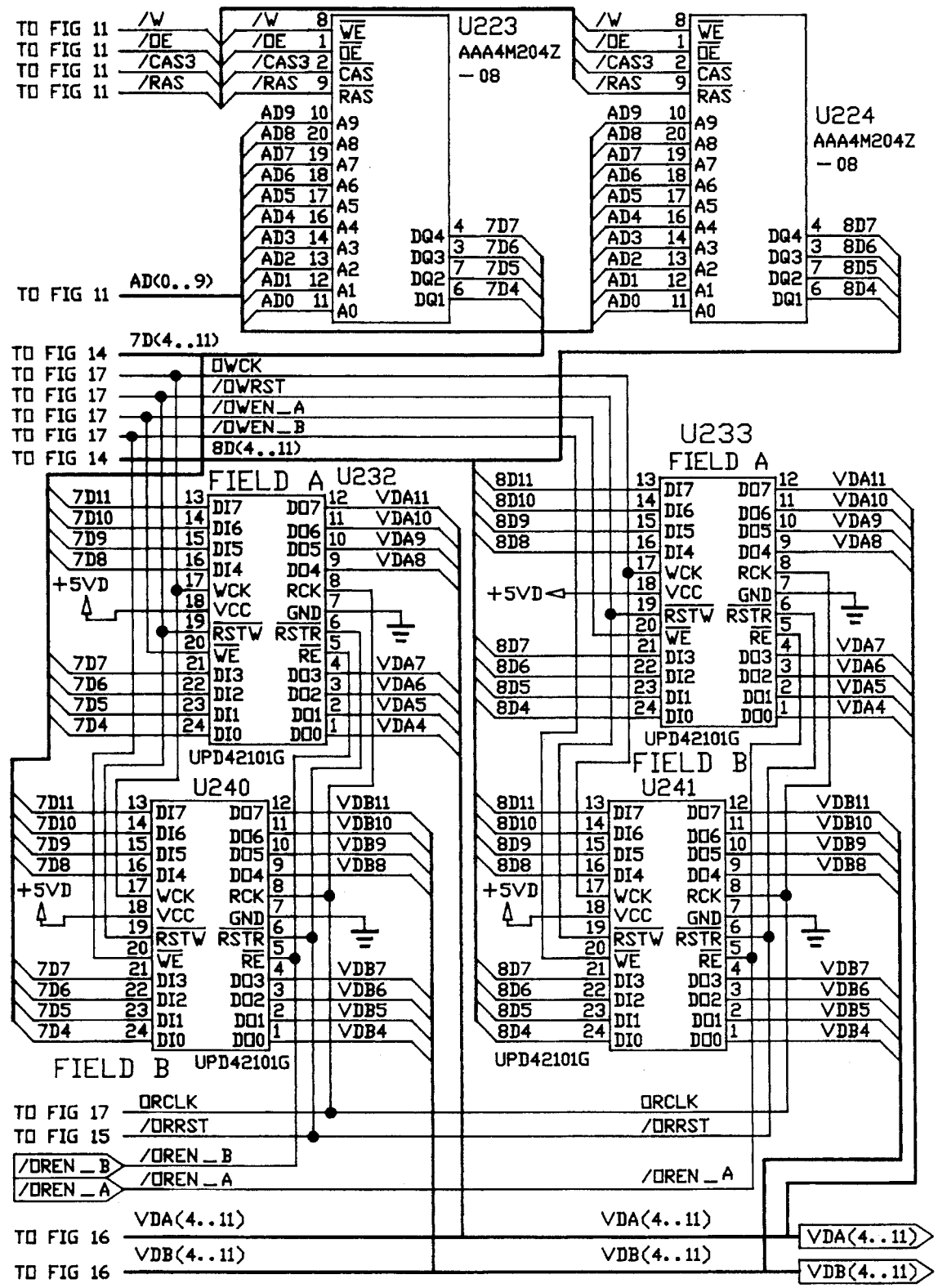
FIG. 18 is a eighth section schematic diagram of the Memory sections of the preferred embodiment of the invention.

FIG. 18 is a eighth section schematic diagram of the Memory sections of the preferred embodiment of the invention. This Figure shows the second DRAM comprising the lower half (bits 4–7) of the upper section of the fourth and fifth memory cells, and the corresponding read port FIFOs.

Figure 19:
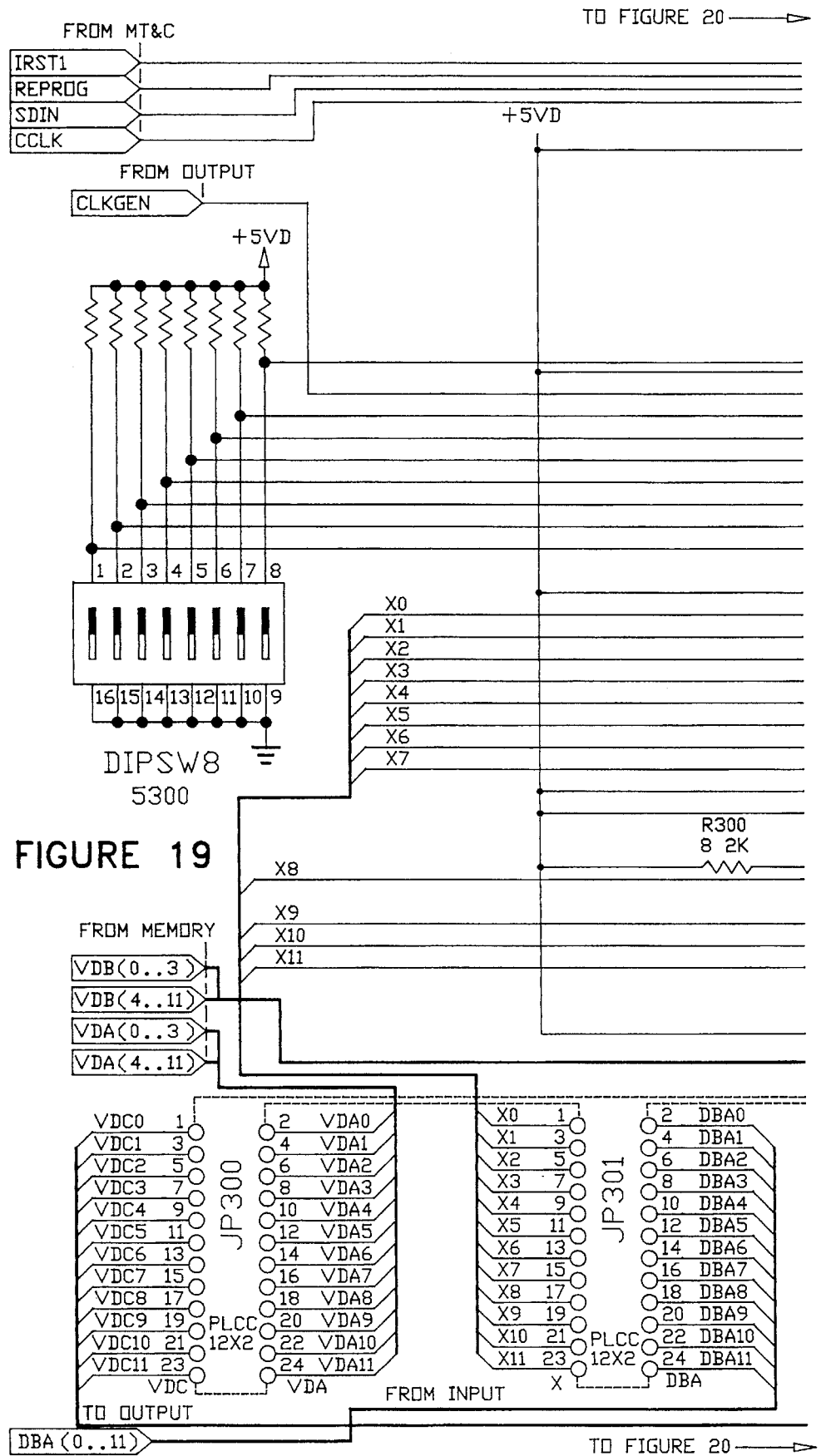
FIG. 19 is a first section schematic diagram of the Digital Filter sections of the preferred embodiment of the invention.

FIG. 19 is a first section schematic diagram of the Digital Filter sections of the preferred embodiment of the invention, showing jumper connections JP300 and JP301 and showing the preferred mechanical arrangement of the jumpers of the filter section connectors shown.

Figure 20:
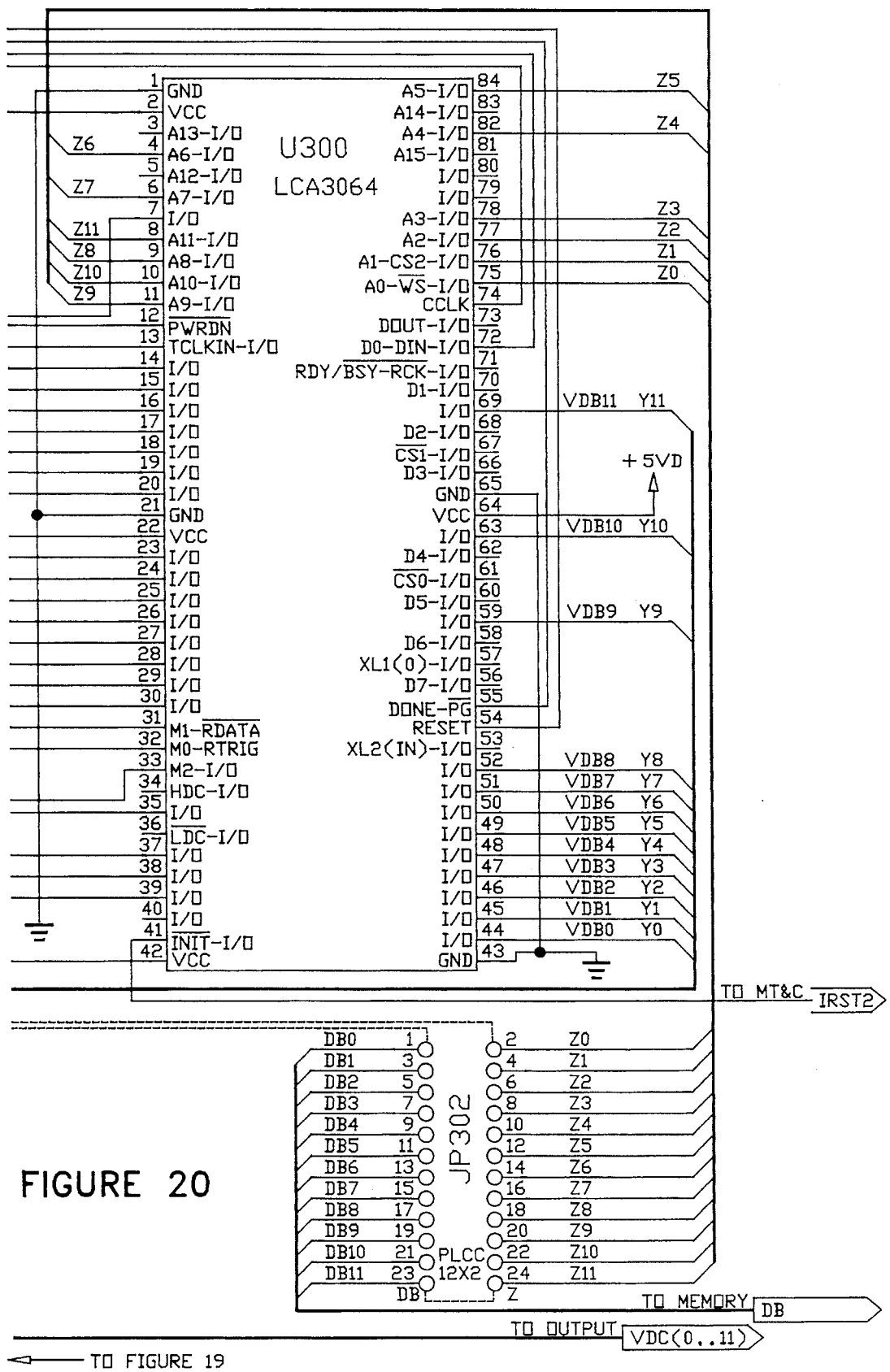
FIG. 20 is a second section schematic diagram of the Digital Filter sections of the preferred embodiment of the invention.

FIG. 20 is a second section schematic diagram of the Digital Filter sections of the preferred embodiment of the invention and with FIG. 19, and JP302 data connections for the various portions of the data flow within the preferred embodiment of the invention. It will be recognized that by jumpering from one data output to another data input that it is possible to configure the filter IC U300 to either a recursive or nonrecursive position with respect to the memory. Noise reduction is performed by IC U300 in a preferred fashion described in U.S. Pat. No. 4,305,091. Those skilled in the art may practice the '091 invention in either recursive or nonrecursive form by appropriate strapping of Jumpers 300–302.

The actual noise reduction comparison and processing is performed inside a programmable gate array U300 manufactured by XILINX. This gate array receives data signals from jumpers and memory, and provides noise reduced video to the jumpers. The noise reduced signal may thus be produced by the input and memory signals, and output to the memory input, or may be produced by the input and memory signals, and output to the synchronizer output, or may be produced by two memory signals, and output to the synchronizer output, all depending on how the jumpers are strapped.

The EPROM program listings given previously both contain the configuration data for configuring U300 to perform the desired noise reduction of the video signal.

Figure 21:
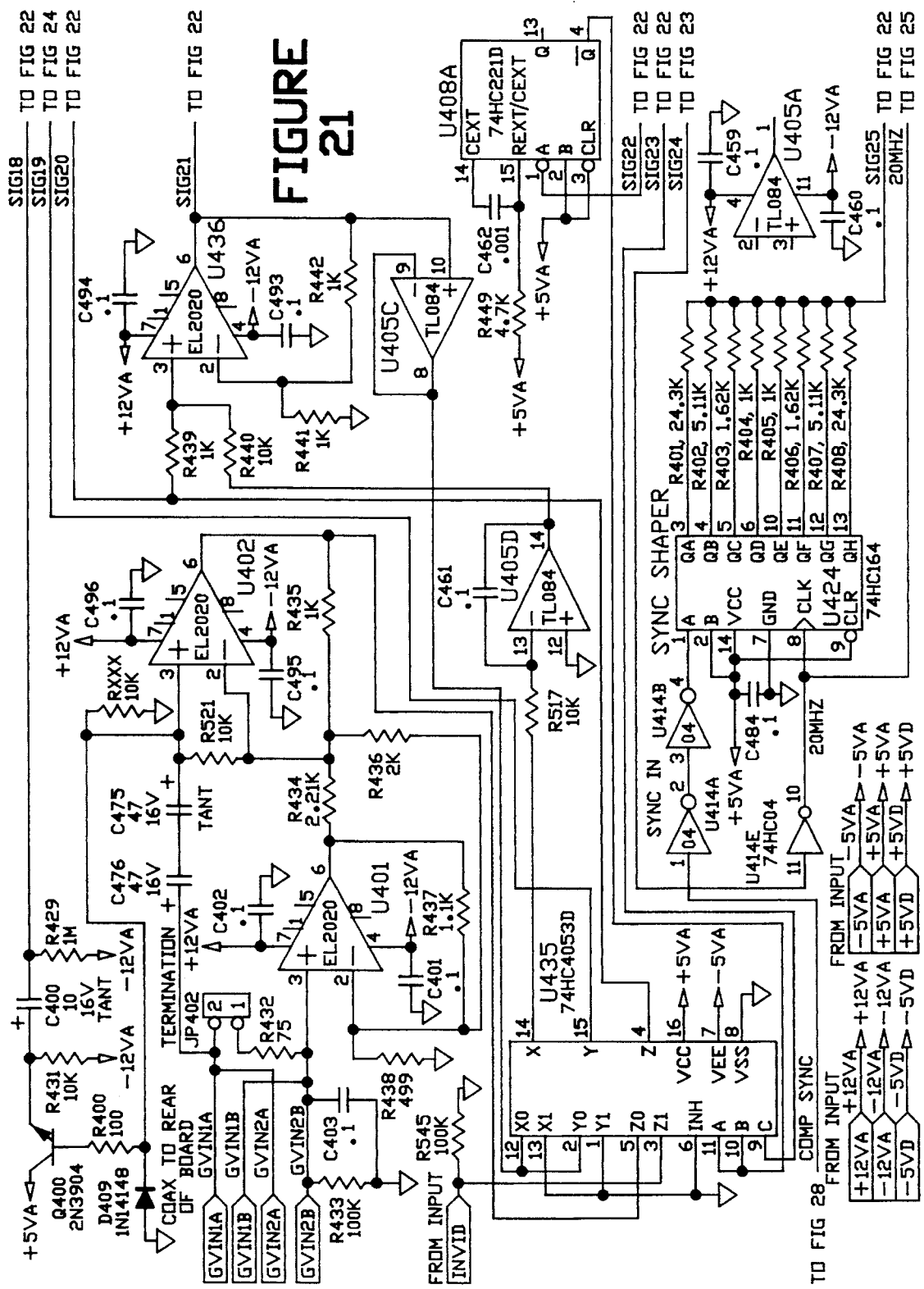
FIG. 21 is a first section schematic diagram of the D/A and Output Video sections of the preferred embodiment of the invention.

FIG. 21 is a first section schematic diagram of the D/A and Output Video sections of the preferred embodiment of the invention. This figure shows the differential reference signal input in the upper left. The reference input amplifier U401, U402 and U436 and clamp U435 and U405D is similar to that of the input video circuit. In addition, the reference section includes a video switch, the Z section of U435 which selects the input signal as the reference in the event the reference signal is missing. Q400 which drives Q401, U413A and via D403 U413B are used to detect the presence of the reference signal and operate the switch. Using the input signal as the reference is a novel and desirable feature of the present invention since this allows the synchronizer to operate as a fixed length video delay usable for timing purposes.

In addition to the reference input processing circuitry, FIG. 21 shows a sync shaper circuit U424 operable to provide $sin^2$ shaped synchronizing pulses usable to replace the sync pulses in the output video signal.

Figure 22:
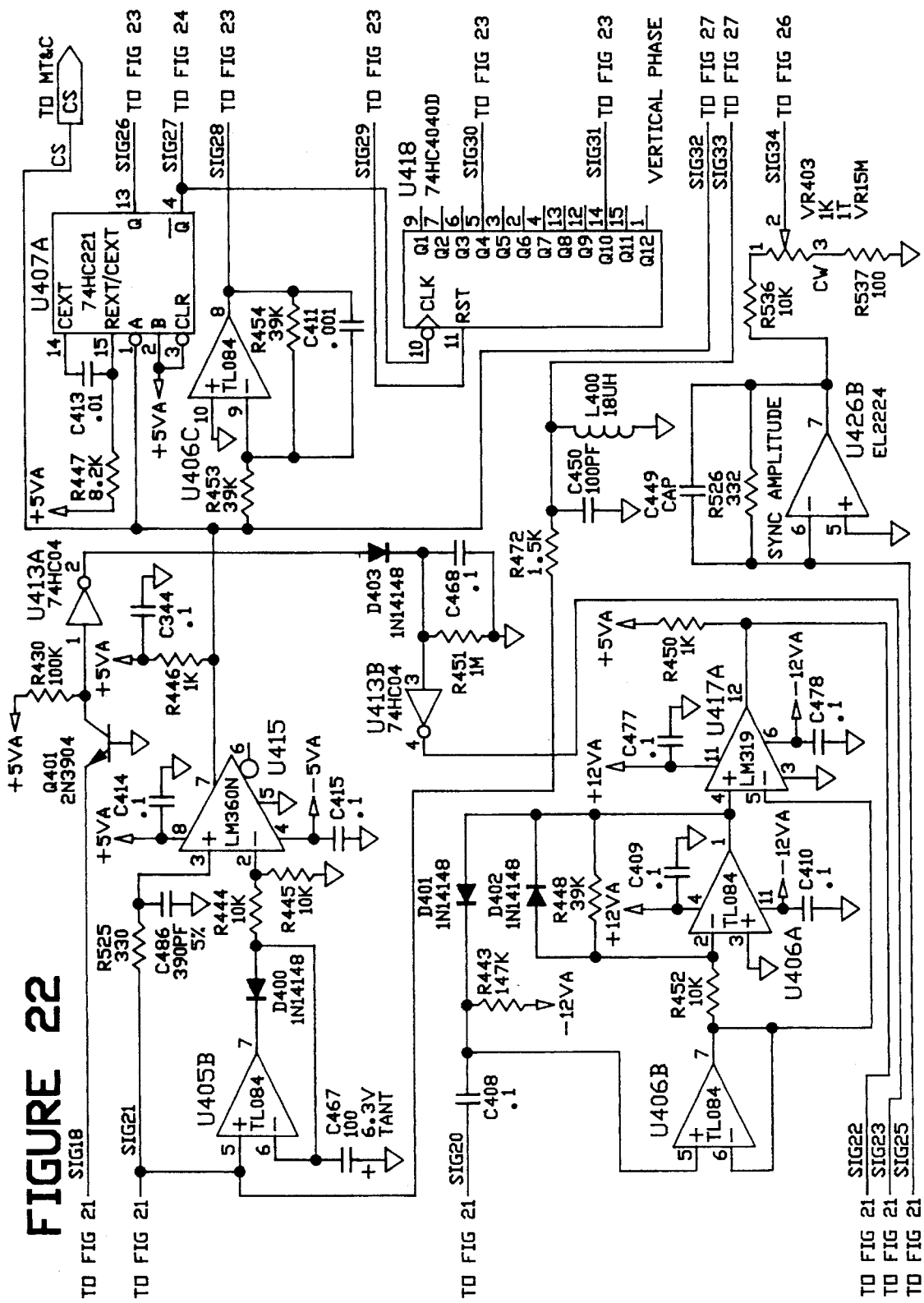
FIG. 22 is a second section schematic diagram of the D/A and Output Video sections of the preferred embodiment of the Invention.
Figure 23:
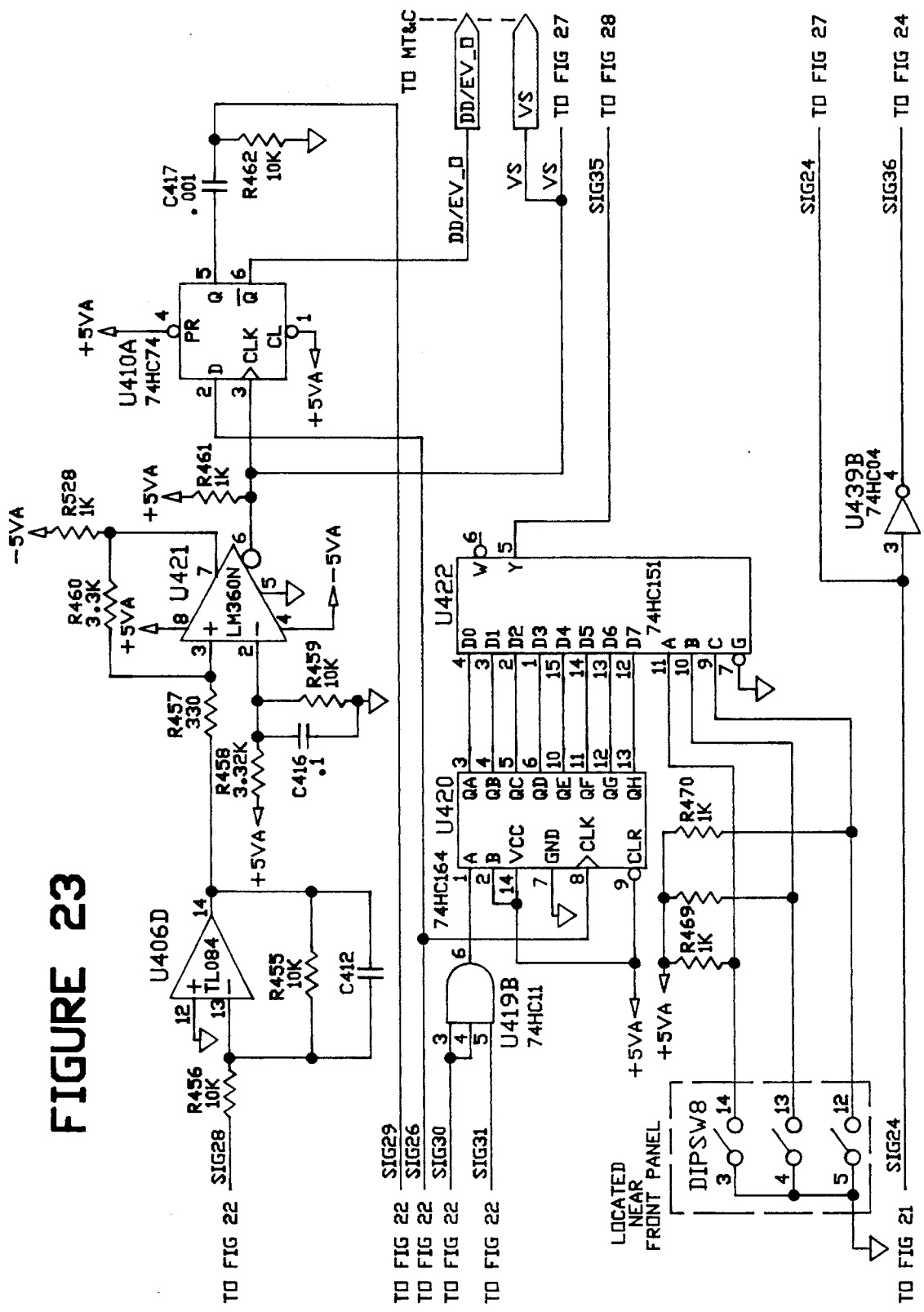
FIG. 23 is a third section schematic diagram of the D/A and Output Video sections of the preferred embodiment of the invention.

FIGS. 22 and 23 are second and third sections schematic diagram of the D/A and Output Video sections of the preferred embodiment of the invention. These figures show the sync tip peak detector U405B which samples and holds the voltage of the sync tip peak on hold capacitor C467. The sync tip voltage is divided by two by R444 and R445 providing a 50% reference level for sync comparator U415. The TTL level sync from U415 is coupled to several sections, including U407A which eliminates ½ H pulses to provide H pulses, and U406C, U406D (FIG. 23) and U421 which operate to integrate the TTL sync and provide a TTL vertical sync signal. U418 of FIG. 22 operates with U419B (FIG. 23), U420, U422 and dip switch 8 to provide an adjustable vertical reset signal out of pin 5 of U422 which is used to reset the reference sync generator U423 pin 12 (FIG. 28) thus allowing the reference sync generator, and thus the output video to be locked ahead or behind the reference video in 1 H increments. FIG. 23 also shows a D Flipflop, U410A which clocks the H signal from U407A with vertical sync from U421 to provide a field square wave signal. The field square wave signal is differentiated with C417 and R462 to provide a reset pulse for vertical counter U418, and to provide an ODD/EVEN signal for the memory control circuit.

Figure 24:
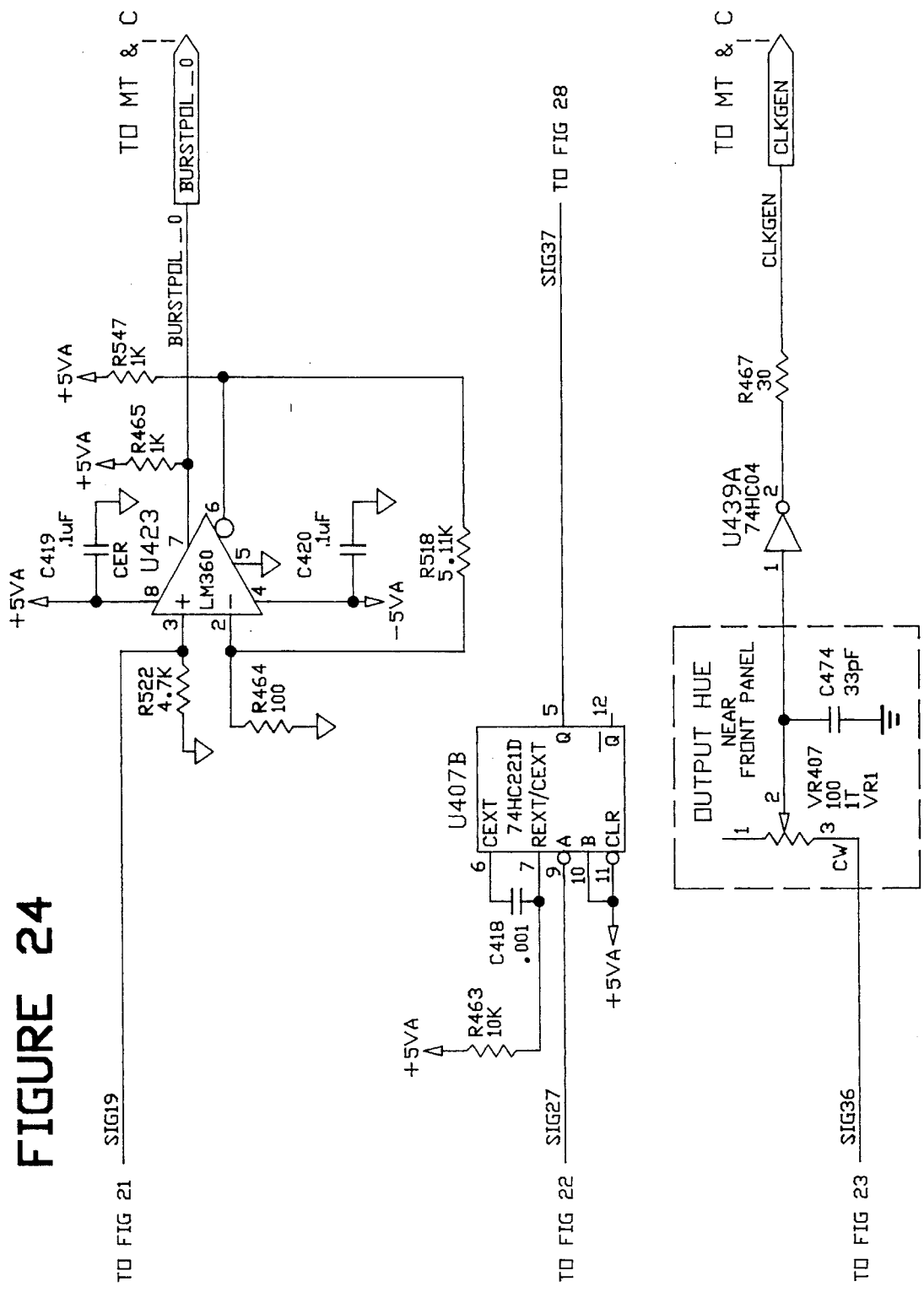
FIG. 24 is a fourth section schematic diagram of the D/A and Output Video sections of the preferred embodiment of the invention.
Figure 28:
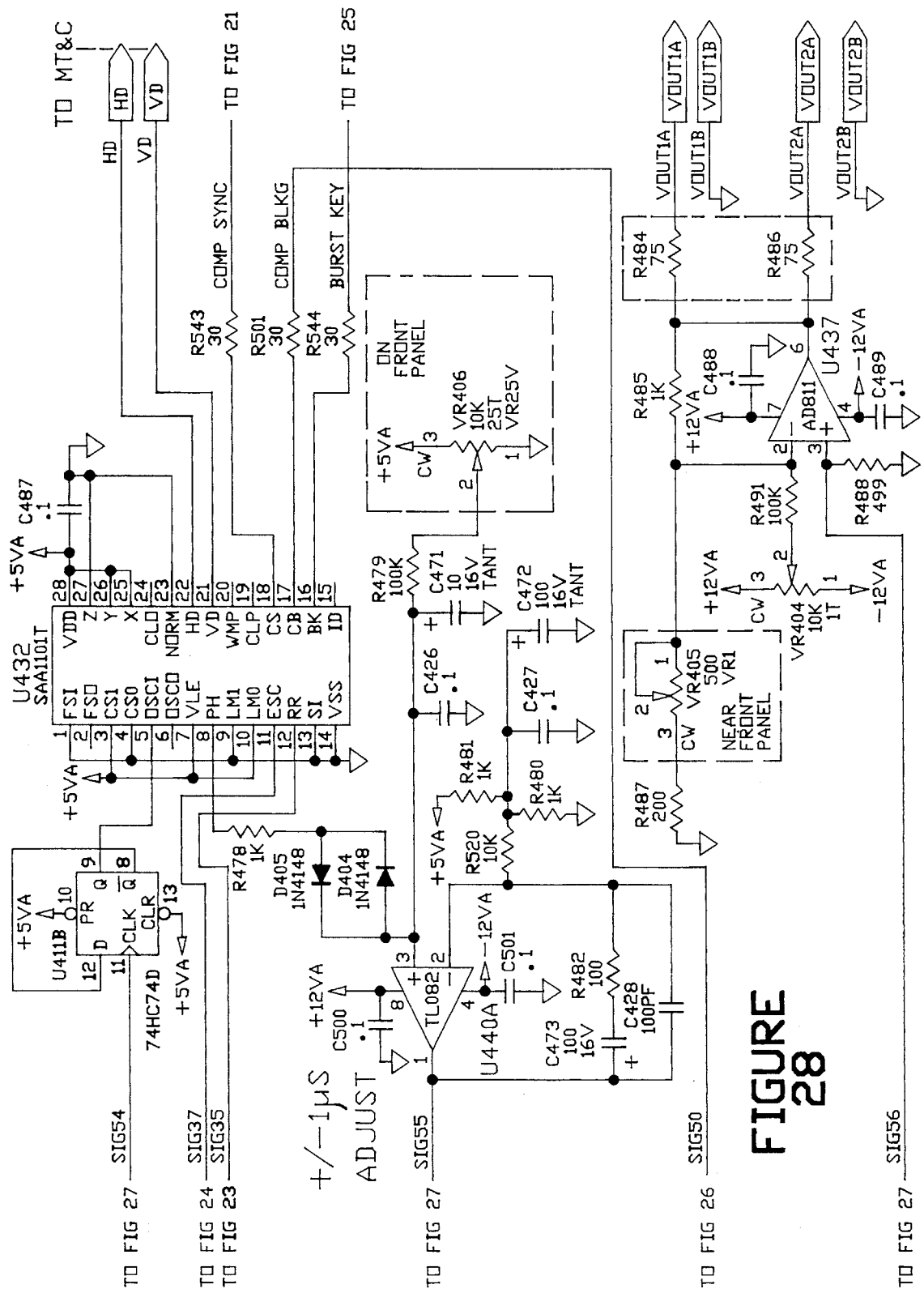
FIG. 28 is a eighth section schematic diagram of the D/A and Output Video sections of the preferred embodiment of the invention.

FIG. 24 is a fourth section schematic diagram of the D/A and Output of the preferred embodiment of the invention which shows a one shot U407B operating on reference comp sync to provide sync pulses for input to the reference sync generator U423 pin 11 (FIG. 28). In addition, color burst from the reference video is coupled to U423 to provide a TTL level signal corresponding to the positive half cycle period of the burst. This signal is used by the memory control circuit to distinguish field 1 from field 3 in NTSC, or field 1 from field 4 in PAL. It is not necessary to use this signal for monochrome or SECAM signals. Also shown in FIG. 24 is a variable phase shifter VR407 and C474 which is used to shift the phase of the clock signal in order to delay the reading of video from memory by a variable amount. When new sync and burst is added to the output video, this adjustment operates as a fine video chroma phase control.

Figure 25:
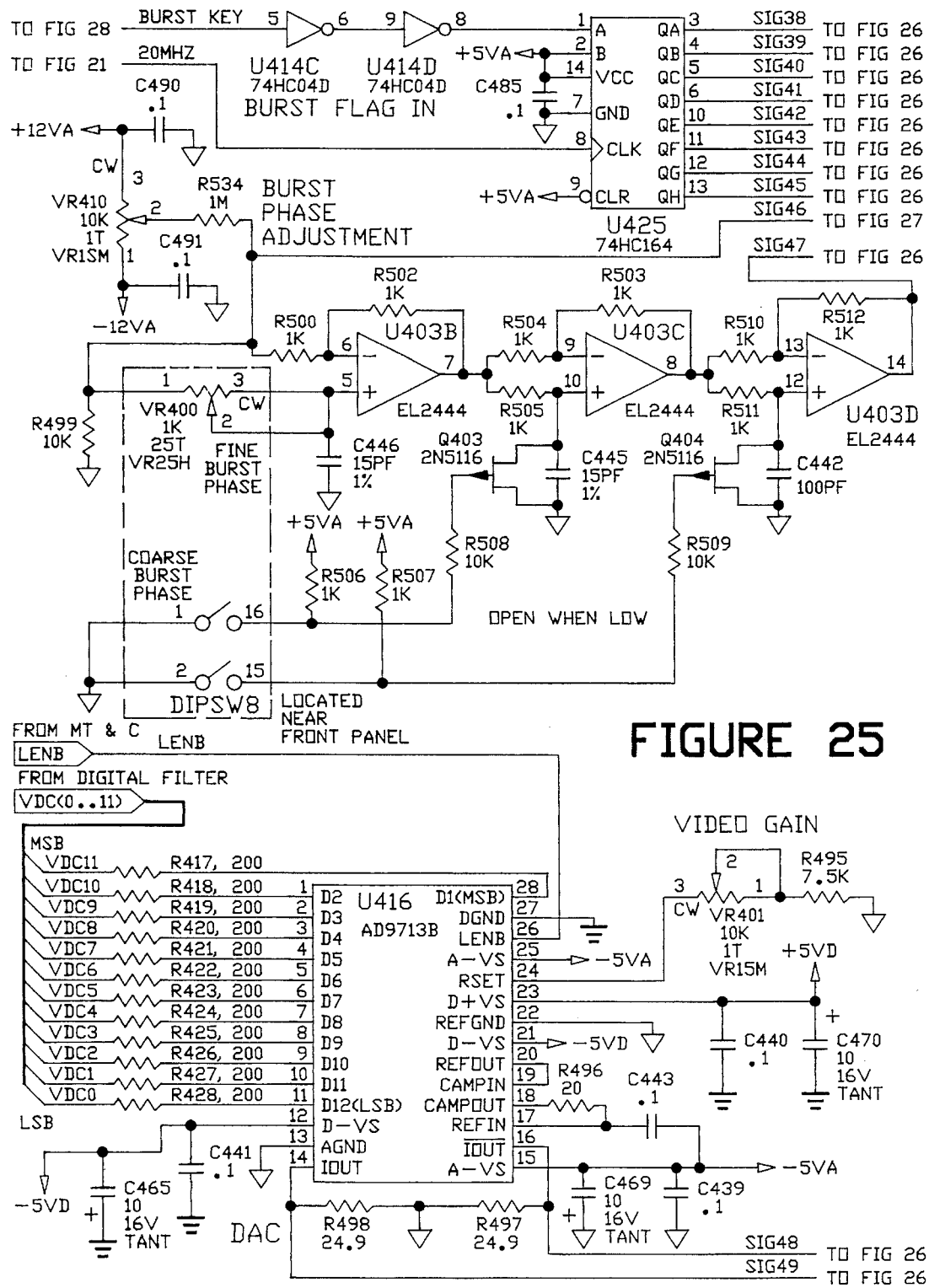
FIG. 25 is a fifth section schematic diagram of the D/A and Output Video sections of the preferred embodiment of the invention.
Figure 26:
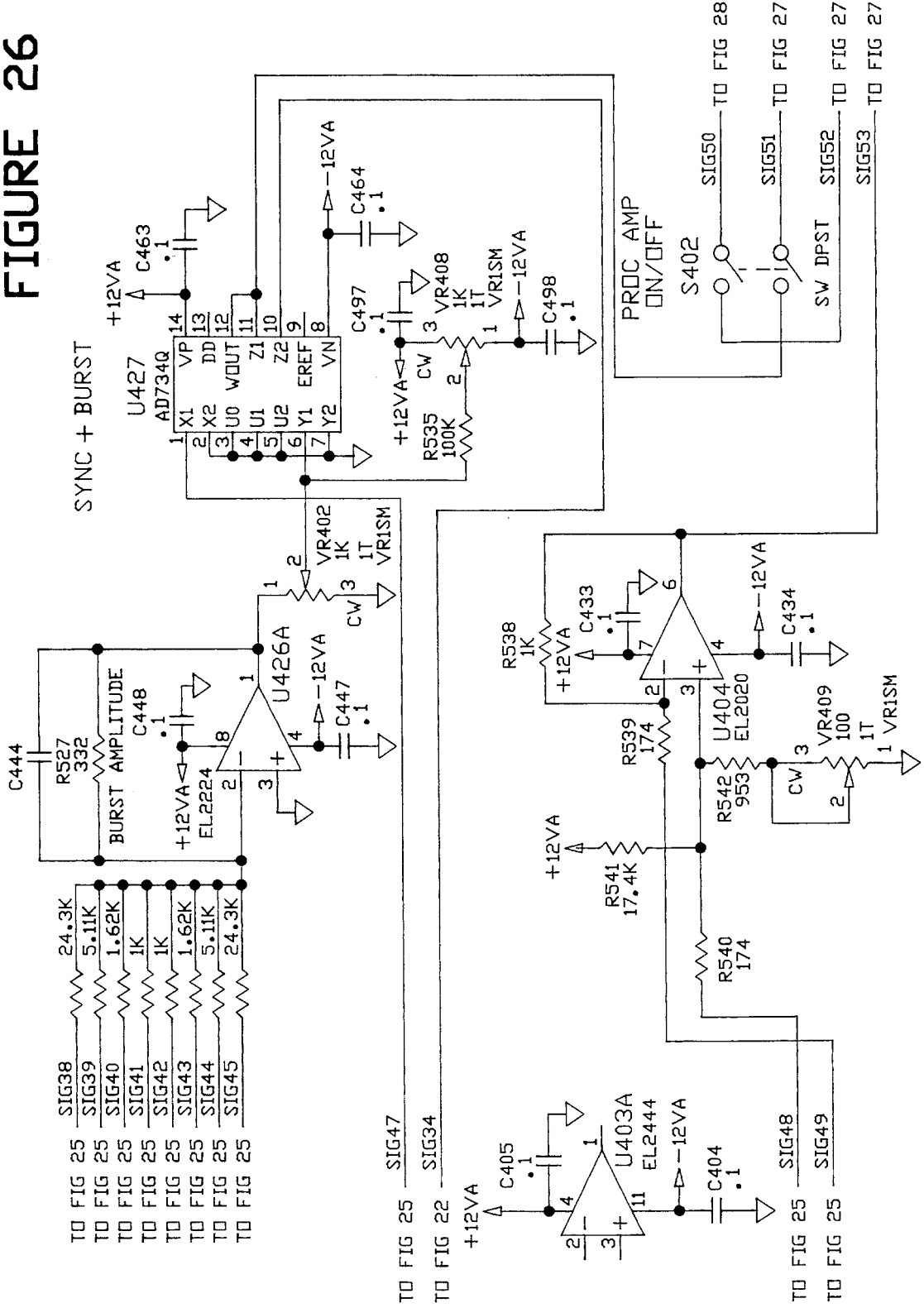
FIG. 26 is a sixth section schematic diagram of the D/A and Output Video sections of the preferred embodiment of the invention.

FIGS. 25 and 26 are fifth and sixth section schematic diagrams of the D/A and Output Video sections of the preferred embodiment of the invention. These diagrams shows a burst shaper U425, and U426A which operate to shape the edges of the burst flag signal from the reference sync generator (U432 of FIG. 28) with a $\sin^2$ shape. This burst flag is multiplied with the color subcarrier in multiplier U427 to provide a shaped burst. U427 also operates to add sync from the sync shaper to the burst. The subcarrier for the burst is supplied from adjustable phase shifter comprised of U403B, C and D. It should be noted that VR400 provides an adjustable phase shift which is adjustable over approximately 120° and switches 1&2 of dip switch 8 each provide a switched 120° adjustment. In this fashion, a full 360° adjustment may be obtained. For PAL operation, one of the FET switches in this phase shifter may be switched so as to provide the ±90° burst phase shift on a line by line basis.

FIG. 25 also shows the D/A convertor, U416 which converts the digital video signal back to analog. The output of the D/A is differential current and must be converted to voltage, which is performed by amplifier U404 of FIG. 26.

Figure 27:
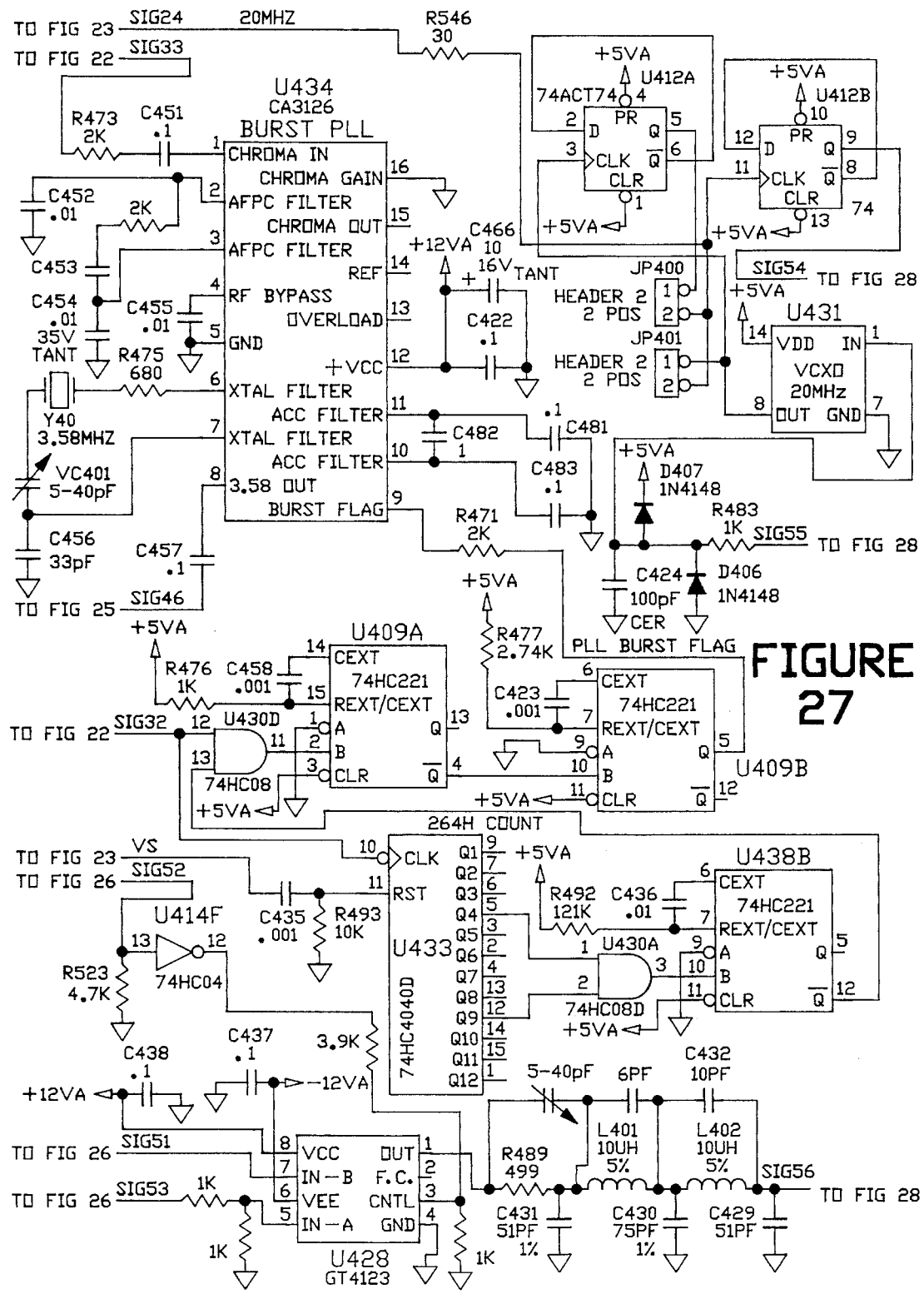
FIG. 27 is a seventh section schematic diagram of the D/A and Output Video sections of the preferred embodiment of the invention.

FIG. 27 is a seventh section schematic diagram of the D/A and Output Video sections of the preferred embodiment of the invention, showing the burst PLL U434 which receives the burst from the reference video on pin 1 and provides a continuous subcarrier out on pin 8. This subcarrier is used to create a new burst signal having adjustable phase which may be inserted in the output video. While shown with NTSC component values, this circuit may be operated in PAL as well. It is not used for SECAM or monochrome signals. A burst flag for the chroma PLL is generated from the reference video sync by one shots U409A&B in response to counter U433, U430A and oneshot U438B.

FIG. 27 also shows VCXO U431 which may be either 20 MHz or 40 MHz frequency, and with dividers U412A&B which are jumpered with jumpers JP400 and JP401 to accommodate the frequency in use. Normally a 20 MHz part would be used however it is also possible to use a 40 MHz part which is used on the input PLL. The frequency of VCXO U431 is controlled by the control signal on pin 1.

FIG. 27 also shows analog switch U428 which is used to reinsert new bursts blanking and sync in the output video. Output video is input on pin 5, new burst and blanking on pin 7 and during the blanking period, a control signal on pin 3 causes the new burst and blanking to be inserted. Normally, the control signal is comprised of composite blanking, however from the teachings herein, it will become apparent to one skilled in the art that other signals may be used as well to tailor the insertion of new signals to meet the needs of a particular application. For example, only vertical sync and horizontal blanking may be utilized thus allowing only sync and burst to be inserted while preserving vertical interval signals. Other signals such as vertical and horizontal are available from the reference sync generator IC U432 which signals may be combined by simple logic to provide selective insertion of reconstructed repetitive signals as desired, thus maintaining any non-repetitive signals which are outside of the active video area. The insertion may be entirely defeated, causing the digitized sync burst and blanking, as well as any test signals, sound in sync or other wanted signals to be passed by switching S402 to the down or open position.

The video out of switch 428 is coupled to the reconstruction filter shown on the lower right of FIG. 27. This filter removes the 20 MHz clock component from the video signal, as well as providing sinX/X compensation and frequency response flattening via the trim capacitor.

FIG. 28 is a eighth section schematic diagram of the D/A and Output Video sections of the preferred embodiment of the invention. This figure shows the reference sync generator U432 which is phase locked to the reference video signal just as the input sync generator was phase locked to the input video signal. The error integrator is U440A and the horizontal phase adjust is VR406. In addition, the output video buffer amplifier U437 is shown with video gain control VR405 and DC offset control VR404.

It will be understood by one skilled in the art that in configurations such as the preferred 6 board case and 12 board case where multiple video synchronizer boards are utilized to synchronize multiple video feeds to a common reference signal, that the circuitry to couple to and strip synchronizing and burst signals off of the reference, which includes U401, U402, U436, U435, U415, U406, U421, U410, U418, U420, U419B, U434 and associated circuitry need not be duplicated for each channel. It will be understood from these teachings that an extremely cost effective embodiment may be had by coupling the subcarrier from pin 8 of U434, Vertical sync from pin 6 of U410, Line count from the outputs of U428 and horizontal sync from pin 4 of U407 to the remaining circuitry which will be duplicated for each channel. Such sharing of the reference processing circuitry will provide individual phase controls for each output but allows them to all be timed from a common reference signal. The supplied signals may be different than those suggested, for example H sync may be used in place of line count from U428 and individual line counters placed on each output thus reducing the number of interconnection signals at the expense of additional parts usage. Alternatively, it will be seen from the teachings herein that other signals may be utilized for reference, for example individual ones of clock, subcarrier, H and V sync and field one reference may be utilized in respect to the multiple synchronizer configuration described herein and a single genlock circuit may be utilized to provide such reference signals for all of the multiple synchronizers being utilized, but still retaining individual phase controls for each.

The circuits described above can be used with both NTSC and PAL standard signals as well as other video formats. The two preferred embodiment programs for 525 and 625 line operation are given above. In addition, other minor changes to both the input and output analog and PLL circuits will of course be necessary to change from NTSC (which is shown) to PAL. These changes include changing the frequency of the Burst PLL U434 (FIG. 27) to operate at the 4.43 MHz subcarrier rate, and changing the burst phase shifter (FIG. 25) to add the ±45° phase shift by switching one of the FETs with an H/2 signal. In addition changing the two VCXOs (FIGS. 5 & 28) is required to operate them at 40.0 MHz instead of 40.3 MHz so that the sampling clock continues to run at 2560 times H. The vertical counter U433 will need to be reconfigured to count 314 instead of 264 and the Philips SAA1101 Sync generator ICs (FIGS. 5 & 28) need to be reconfigured for PAL operation according to the manufacturers recommendations. Other minor changes to convert the operation to PAL will be apparent to those skilled in the art from the teachings herein. It may be noted that due to the high sampling frequency that the anti aliasing and reconstruction filtering used herein is relatively independent of the signal standard used as compared to those normally used in synchronizing devices. No change of the present filters is needed when changing to NTSC, PAL, SECAM or HDTV formats, as long as the signal bandwidth is within the bandwidth of the interpolation filter. In the present example, this is approximately 0.22 times the A/D sampling frequency or 8.8 Mhz. It may also be noted that higher A/D sampling frequencies may be utilized with the present configuration, providing the sampling is performed at 2560 times H and that the frequency does not exceed the clock speed limits of the various parts of the circuit.

When the synchronizer is configured for 625 line operation, it may be utilized with SECAM signals by removing, defeating or not using the burst related circuitry which is used for PAL. Since the memory control is H locked and does not use burst except for distinguishing field 1 from 3 in NTSC or 1 from 4 in PAL, burst is not needed for operation. In fact, if burst is not present as with a monochrome signal, or is found to be unusable, the memory controller ignores it. The SECAM signal is then passed just as if it were a 625 line monochrome signal. As a result of digitizing the full waveform, the entire SECAM color carrier will be passed by the synchronizer. When new sync and blanking is reinserted on the output, care must be taken not to blank out the color synchronizing waveforms in the vertical blanking area, and to accommodate the narrower horizontal blanking as is known to one skilled in the art as it pertains to SECAM.

The video synchronizer of the preferred embodiment described herein is suitable for construction on a single PC board of approximately 6×16". While other dimensions having the same area would be acceptable, these dimensions provide considerable flexibility in mounting the board in case sizes which meet standard mounting configurations used by the video industry.

The case configurations available by using the preferred PC board dimensions include a single board desk top version, a 6 board rack mount version, and a 12 board rack mount version. The 6 and 12 board versions may mix boards operating on various signal standards, for example NTSC and PAL boards. The flexibility of mounting configurations provides great utility as compared to prior art designs.

Figure 29:
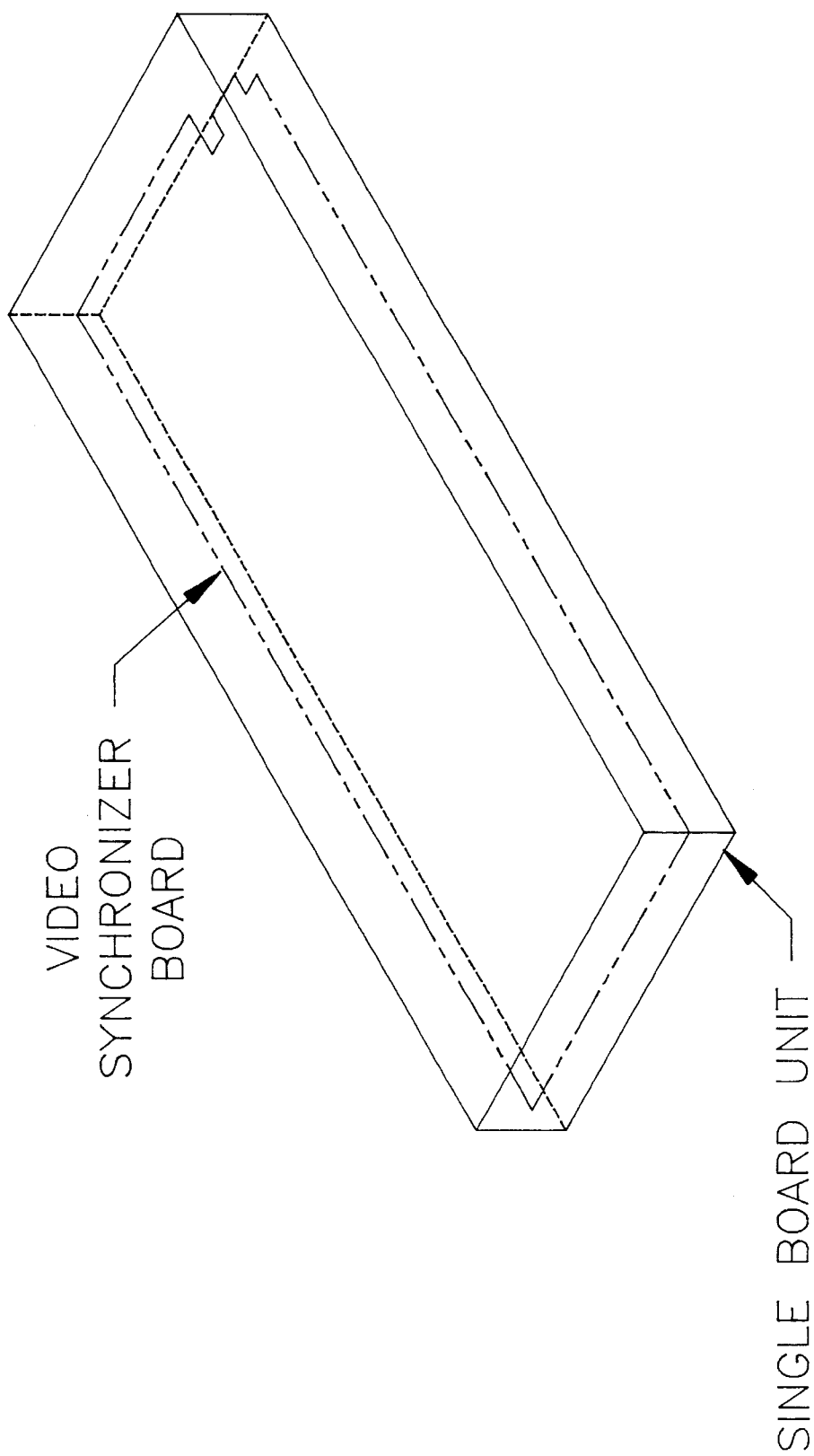
FIG. 29 is a first mechanical diagram of a first mechanical embodiment of the invention showing a single electronic printed circuit board which embodies the electronics of the preferred embodiment housed in a single board case.

FIG. 29 shows the mechanical embodiment of the invention in which a single electronic printed circuit board is housed in a single board case. It can be seen that the size of the case, as allowed by the size of the PC board, which in turn is allowed by the simple and efficient design of the circuitry embodying the invention is quite well adapted to be placed on a desk next to a computer or other video device.

Figure 30:
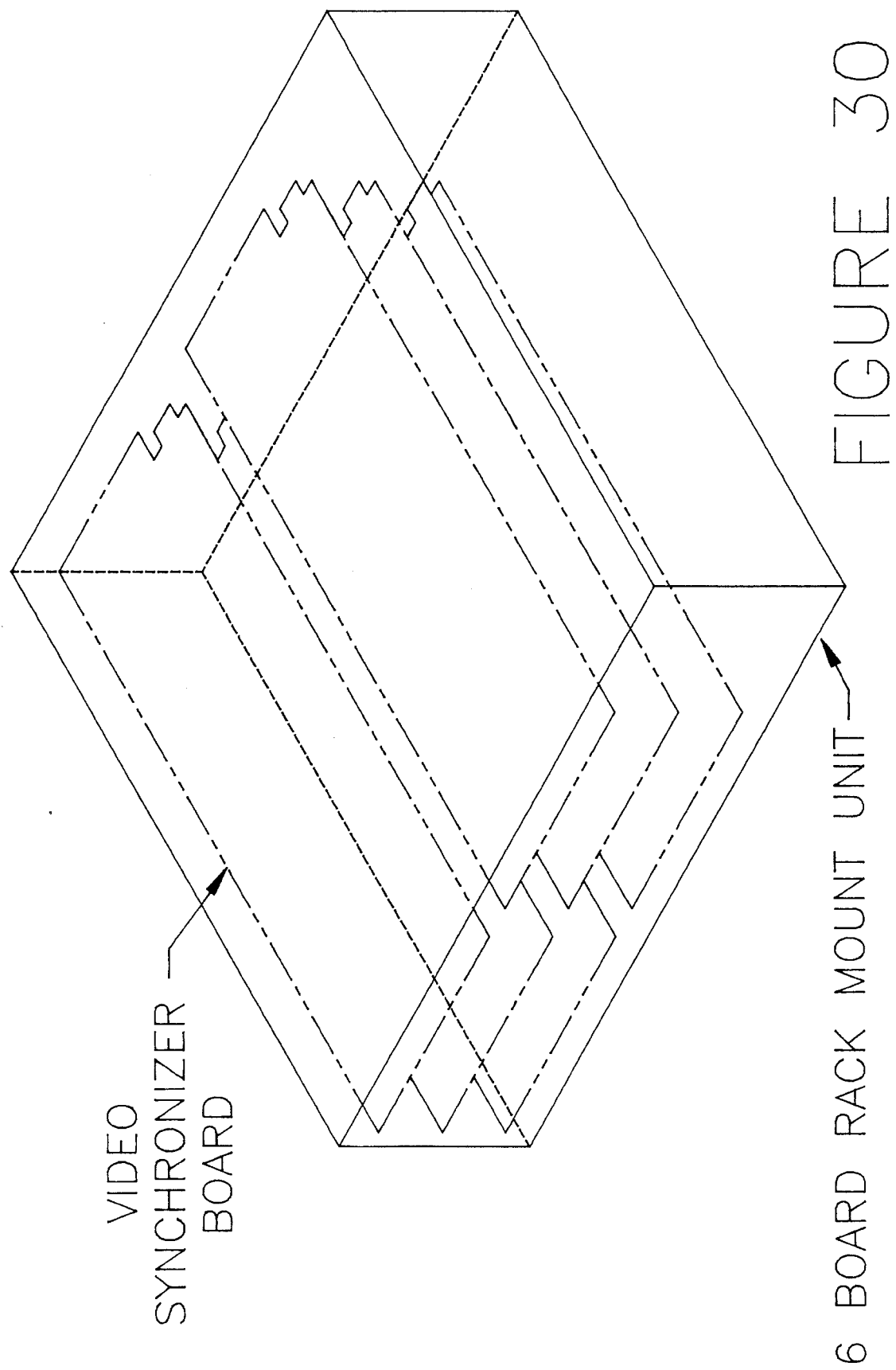
FIG. 30 is a second mechanical diagram of a second mechanical embodiment of the invention showing six electronic printed circuit boards which each of which embodies the electronics of the preferred embodiment housed in a six board case.

FIG. 30 shows second mechanical diagram of the invention showing a six electronic printed circuit boards housed in a six board case. It can be seen that the size of the case, as allowed by the size of the PC boards therein, which are the same board as above is quite well adapted to be placed in a standard 3.5" high 19" wide equipment rack.

FIG. 31 is a third mechanical diagram of the invention showing a twelve printed circuit boards housed in a twelve board case. It can be seen that the size of this case, as allowed by the size of the PC boards therein, which are the same board as above is quite well adapted to be placed in a standard 7" high 19" wide equipment rack.

It can thus be appreciated from the above FIGS. 29–31 that the ability to squeeze high performance into a relatively small PC board allows unobvious flexibility in the packaging of the invention for multiple applications. The achievement of this inventive feature is brought about by the novel use of circuitry to perform wanted features in nonconventional ways, including but not limited to the use of large amounts of memory and high sampling speeds to reduce circuit complexity and board size and power consumption. For example, the size reduction is supported by the elimination of complex filtering by use of oversampling and interpolation, elimination of complex chroma burst locking circuitry and chroma inversion circuitry by the use of a full repetition period of memory, elimination of complex memory timing and address generation circuitry by not fully utilizing the large memory ICs which were selected and making the memory addressing logically correspond to the video synchronizing, the elimination of complex and fast acting freeze circuitry by the use of more than a full repetition period of memory. The reduction in power consumption is brought about by minimizing the electronic circuitry, and be keeping memory speeds to relatively low levels. Other novel features support the size and power reduction as well.

What is claimed is:

1. An electronic apparatus for processing an input signal having synchronizing components including in combination:

a) an input processing section responsive to said input signal to separate said synchronizing components therefrom and to provide a processed signal;

b) a clock section for generating a sampling clock;

c) a sampling section operative to sample said processed signal and provide samples thereof in response to said clock section;

d) an interpolation section responsive to groups of said samples to perform interpolation thereof to provide filtered samples having improved resolution;

e) a memory section responsive to a reference signal and said filtered samples to provide a stored signal synchronized in response to said reference signal which reference signal may be a phase shifted version of said input signal.

2. Apparatus as claimed in claim 1 wherein said clock section operates to provide a sampling clock having a predetermined relationship with said synchronizing components.

3. Apparatus as claimed in claim 1 wherein said sampling section operates to continuously sample the full amplitude of said input signal over at least one repetition period and wherein said memory section stores at least said one repetition period worth of said filtered samples.

4. Apparatus as claimed in claim 1 wherein said synchronizing components define horizontal lines and said clock section for generating a sampling clock operates to provide a known number of sampling clocks for each horizontal line and wherein said sampling section operates to sample said input signal to provide said known number of samples for each said horizontal line, and where said interpolation section is responsive to said known number of samples which have a first resolution to provide a second number of filtered samples having a second resolution.

5. Apparatus as claimed in claim 1 wherein said sampling section operates to continuously sample said input signal over at least one repetition period and wherein said memory section stores at least said one repetition period worth of said filtered samples, said apparatus further including an input signal disruption section to detect when said input signal is disrupted, with said memory section responsive thereto to repetitively output said repetition period of stored filtered samples during at least the pendency of said disruption.

6. Apparatus as claimed in claim 1 further including
   f) a second input processing section responsive to a second input signal to separate synchronizing components therefrom and to provide a second processed signal;
   g) a second clock section for generating a second sampling clock;
   h) a second sampling section operative to sample said second processed signal and provide samples thereof in response to said clock section;
   i) a second interpolation section responsive to groups of said samples from h) above to provide filtered samples;
   j) a memory section responsive to said reference signal from e) above and said filtered samples from i) above to provide synchronization of said filtered samples from i) to said reference signal which reference signal may be a version of one of said input signal or said second input signal.

7. An apparatus responsive to a reference signal and operative with a plurality of input electronic signals having uncontrolled synchronization thereto including in combination for each said input signal:
   a) an input processing section responsive respectively to said input signal to provide synchronizing components related thereto and to provide a processed signal which is a version of said input signal;
   b) for each said input signal a clock section for generating a sampling clock;
   c) a sampling section operative to sample said processed signal and provide samples thereof in response to said clock section;
   d) a memory section responsive to said reference signal and said samples to provide a stored signal synchronized in response to said reference signal.

8. Apparatus as claimed in claim 7 further including an interpolation section responsive to groups of said samples from c) to perform interpolation thereof to provide filtered samples with said memory section from d) responsive to said filtered samples in place of said samples from c) to provide synchronization of said filtered samples in response to said reference signal.

9. An electronic apparatus for processing an input signal which is a video signal including in combination:
   a) an input processing means responsive to said input signal to separate horizontal synchronizing components therefrom and to provide a processed signal which has been restored to a known DC value;
   b) a clock means for generating a sampling clock which is phase locked to said horizontal synchronizing components;
   c) a sampling means operative to sample and digitize said processed signal and provide samples thereof in response to said sampling clock;
   d) an interpolation means responsive to groups of said samples to perform interpolation thereof to provide filtered samples having improved bits of resolution;
   e) a memory means responsive to a reference signal to temporarily store said filtered samples to provide a stored signal synchronized in response to said reference signal which reference signal may be a version of said input signal.

10. Apparatus as claimed in claim 9 wherein said clock means operates to provide a sampling clock having a predetermined integer multiple frequency relationship with said synchronizing components and with a known phase relationship.

11. Apparatus as claimed in claim 9 wherein said sampling means operates to continuously sample the full amplitude from sync tip to peak white of said input signal over at least one repetition period of the scanning and color subcarrier cycles and wherein said memory means stores at least said one repetition period worth of said filtered samples.

12. Apparatus as claimed in claim 9 wherein said sampling means operates to sample said input signal to provide a known number of samples for each horizontal line, and where said interpolation means is responsive to said known number of samples which have a first number of bits resolution to provide a second number of filtered samples having a second number of bits resolution.

13. Apparatus as claimed in claim 9 wherein said sampling means operates to continuously sample said input signal over at least one repetition period of the scanning and color subcarrier cycles and wherein said memory means stores at least said one repetition period worth of said filtered samples, said apparatus further including an input signal disruption means to detect when said input signal is disrupted, with said memory means responsive thereto to cease storing of samples and repetitively output said repetition period of stored filtered samples during at least the pendency of said disruption.

14. Apparatus as claimed in claim 9 further including
   f) a second input processing means responsive to a second input signal which is a video signal to separate synchronizing components therefrom and to provide a second processed signal;
   g) a second clock means for generating a second sampling clock which is phase locked to said synchronizing components from f);
   h) a second sampling means operative to sample and digitize said second processed signal and provide samples thereof in response to said second sampling clock from g);
   i) a second interpolation means responsive to groups of said samples from h) to provide filtered samples;
   j) a memory means responsive to said reference signal from e) to temporarily store said filtered samples from i) to provide synchronization of said filtered samples from i) in response to said reference signal from e) which reference signal may be a version of one of said input signal or said second input signal.

15. An apparatus responsive to a reference signal and operative with a plurality of mutually unsynchronized input signals which are video signals including in combination:
   a) for each said input signal an input processing means responsive respectively to said input signal to provide horizontal synchronizing components related thereto and to provide a processed signal which is a DC restored version of said input signal;
   b) for each said input signal a clock means for generating a sampling clock phase locked to said horizontal synchronizing components corresponding thereto;
   c) for each said input signal a sampling means operative to sample and digitize the corresponding said processed signal and provide samples thereof in response to the corresponding said clock means;
   d) for each said input signal a memory means responsive to said reference signal and the corresponding said samples to provide a stored signal synchronized in response to said reference signal.

16. Apparatus as claimed in claim 15 further including for each said input signal an interpolation means responsive to the corresponding groups of said samples from c) to perform interpolation thereof to provide filtered samples with the corresponding said memory means from d) responsive to said filtered samples in place of said samples from c) to provide synchronization of said filtered samples in response to said reference signal.

17. Apparatus as claimed in claim 1, 2, 3, 5, 6, 8, 9, 10, 11, 12, 13, 14, or 16 wherein said interpolation operates in response to a first number of samples at a first amplitude resolution to provide a second number of samples at a second improved amplitude resolution.

18. An electronic apparatus for processing an input signal having synchronizing components including in combination:

a) an input processing section responsive to said input signal to separate said synchronizing components therefrom and to provide a processed signal;

b) a clock section for generating a sampling clock;

c) a sampling section operative to continuously sample said input signal over at least one repetition period in response to said sampling clock and provide samples thereof;

d) an input signal disruption section to detect when said input signal is disrupted;

e) a memory section responsive to said sampling section to store said samples of at least one repetition period and to provide a stored signal synchronized in response to a reference signal which reference signal may be a version of said input signal, with said memory section further responsive to said input signal disruption section to repetitively output said repetition period of stored samples during at least the pendency of said disruption.

19. Apparatus as claimed in claim 1, 2, 3, 4, 5, 6, 7, 8, 9, 10, 11, 12, 13, 14, 15, 16 or 18 wherein said memory section is operative to temporarily store a secondary signal in an amount corresponding to the storage of said input signal.

20. Apparatus as claimed in claim 1, 2, 3, 4, 5, 6, 7, 8, 9, 10, 11, 12, 13, 14, 15, 16 or 18 further including:

a reference signal detector operative to determine the presence of an external reference signal;

a switch responsive to said reference signal detector and operative to select said input video signal for use as said reference signal.

21. Apparatus as claimed in claim 1, 2, 3, 4, 5, 6, 7, 8, 9, 10, 11, 12, 13, 14, 15, 16 or 18 further including:

a reference signal detector operative to determine the presence of an external reference signal;

a switch responsive to said reference signal detector and operative to select said input video signal for use as said reference signal with said apparatus operating thereby as a fixed length delay;

a phase adjustment responsive to said input signal being used as said reference signal to allow the length of said fixed length delay to be adjustable.

22. Apparatus as claimed in claim 1, 2, 3, 4, 5, 6, 7, 8, 9, 10, 11, 12, 13, 14, 15 or 16 further including:

a digitizer section to digitize said samples of said input signal;

said interpolation operative to provide digital filtered samples having improved quantizing error;

a image processing circuit responsive to said digital filtered samples in undelayed or relatively delayed form, or both, to improve the visual quality of the image represented by said digital filtered samples.

23. Apparatus as claimed in claim 1, 2, 3, 4, 5, 6, 7, 8, 9, 10, 11, 12, 13, 14, 15, 16 or 18 further including:

a video processing circuit operative to select portions contained within the blanking areas of said stored signal from said memory section in order that said selected portions may be preserved and passed and further operating such that known ones of the repetitive sync burst and blanking portions contained within the blanking areas of said stored signals from said memory section are reconstructed and inserted in said stored signals from said memory section.

24. A method for processing an input signal having synchronizing components including in combination the steps of:

a) recovering said synchronizing components from said input signal;

b) providing a processed signal in response to said input signal;

c) generating a sampling clock;

d) sampling said processed signal to provide samples thereof in response to said sampling clock;

e) interpolating said samples to provide filtered samples having improved resolution;

f) temporarily storing said filtered samples to provide a synchronized signal synchronized in response to said reference signal which reference signal may be a version of said input signal.

25. The method of claim 24 wherein the step c) of generating said sampling clock includes providing a predetermined phase relationship between said sampling clock and said synchronizing components.

26. The method of claim 24 wherein said sampling of step d) is performed in a manner to sample the full amplitude of said input signal continuously over at least one repetition period thereof and wherein said storing step f) includes storing at least said one repetition period worth of said filtered samples.

27. The method of claim 24 wherein said synchronizing components define horizontal lines and said sampling clock provides a known number of samples for each horizontal line and wherein said sampling step d) provides samples in said known number for each said horizontal line, with said interpolation step e) responsive to said known number of samples which have a first resolution to provide a second number of filtered samples having a second resolution.

28. The method of claim 24 wherein said sampling is performed continuously to sample said input signal over at least one repetition period and wherein said storing step stores at least said one repetition period worth of said filtered samples, said method further providing;

a step to detect when said input signal is disrupted;

with said storing step responsive thereto to repetitively output said repetition period of stored filtered samples as said synchronized signal during at least the pendency of said disruption.

29. The method of claim 24 further including g) a second input processing step responsive to a second input signal to separate synchronizing components therefrom and to provide a second processed signal;

h) a second clock generating step for generating a second sampling clock;

i) a second sampling step operative to sample said second processed signal and provide samples thereof in response to said sampling clock;

j) a second interpolation step responsive to groups of said samples from h above to provide filtered samples;

k) a storing step to store said filtered samples from j) above to provide synchronization of said filtered samples from j) to said reference signal which reference signal may be a version of one of said input signal or said second input signal.

30. A method responsive to a plurality of input signals of an electronic type and having uncontrolled synchronization with respect to a reference signal, including for each said input signal the steps of:

a) for each said input signal providing synchronizing components related thereto;

b) providing a processed signal which is a version of said input signal;

c) for each said input signal generating a sampling clock;

d) sampling said processed signal and provide samples thereof in response to said sampling clock;

e) temporarily storing said samples to provide a synchronized signal which is synchronized in response to said reference signal.

31. The method of claim 30 further including:

the step of interpolating groups of said samples from step d) to provide filtered samples;

with said storing step e) responsive to said filtered samples in place of said samples from d) to provide synchronization of said filtered samples in response to said reference signal.

32. The method as claimed in claim 24, 25, 26, 27, 28, 29, or 30 wherein said interpolation operates in response to a first number of samples at a first resolution to provide a second improved number of filtered samples at a second resolution.

33. The method as claimed in claim 24, 25, 26, 27, 28, 29, 30 or 31 including a second storing step operative to store a secondary signal by a storage period corresponding to the storage time of said synchronized signal.

34. The method as claimed in claim 24, 25, 26, 27, 28, 29, 30 or 31 further including:

a reference signal detecting step to determine the presence of an external said reference signal;

a switching step responsive to said reference signal detecting step to select said input video signal for use as said reference signal when no external said reference signal is present.

35. The method as claimed in claim 24, 25, 26, 27, 28, 29, 30 or 31 further including:

a reference signal detecting step operative to determine the presence of an external said reference signal;

a switching step responsive to said reference signal detecting step and operative to select said input video signal for use as said reference signal when no external said reference signal is present with said method operating thereby as a fixed length delay;

a phase adjustment step responsive to said input video signal being used as said reference signal to provide an adjustable length of said fixed length delay.

36. The method as claimed in claim 24, 25, 26, 27, 28, 29, or 31 further including:

a digitizing step to digitize said samples of said processed signal;

said interpolation step operative to provide digital filtered samples having reduced quantizing error;

a image processing step responsive to said digital filtered samples in undelayed or relatively delayed form, or both, to improve the visual quality of the image represented by said digital filtered samples.

37. The method as claimed in claim 24, 25, 26, 27, 28, 29, 30 or 31 further including:

a step of video processing operative to select portions contained within the blanking areas of said synchronized video signal in order that said selected portions may be preserved and passed and further operating such that known ones of repetitive sync burst and blanking portions contained within the blanking areas of said synchronized signal are reconstructed and inserted in said synchronized signal.

* * * * *